US006980176B2

(12) United States Patent
Matsumoto et al.

(10) Patent No.: US 6,980,176 B2
(45) Date of Patent: Dec. 27, 2005

(54) THREE-DIMENSIONAL IMAGE DISPLAY APPARATUS AND COLOR REPRODUCING METHOD FOR THREE-DIMENSIONAL IMAGE DISPLAY

(75) Inventors: Kazumi Matsumoto, Kanagawa (JP); Hiroshi Nishihara, Tokyo (JP)

(73) Assignees: Hitdesign Ltd., Kanagawa (JP); Canon Kabushiki Kaisha, Tokyo (JP)

( * ) Notice: Subject to any disclaimer, the term of this patent is extended or adjusted under 35 U.S.C. 154(b) by 338 days.

(21) Appl. No.: 10/241,699

(22) Filed: Sep. 12, 2002

(65) Prior Publication Data

US 2003/0052836 A1 Mar. 20, 2003

(30) Foreign Application Priority Data

Sep. 13, 2001 (JP) ............................ 2001-277415
Sep. 9, 2002 (JP) ............................ 2002-263265

(51) Int. Cl.[7] ............................ G09G 5/00
(52) U.S. Cl. ............................ 345/6; 348/54; 359/462; 349/106
(58) Field of Search ................ 345/7–9; 359/462–466, 359/475; 348/42, 51, 59; 349/64, 106–110

(56) References Cited

U.S. PATENT DOCUMENTS 5,833,507 A * 11/1998 Woodgate et al. ............ 445/24
5,855,425 A * 1/1999 Hamagishi ..................... 353/7
5,930,037 A * 7/1999 Imai ........................... 359/463
6,445,406 B1 * 9/2002 Taniguchi et al. ............ 348/51
6,462,871 B1 * 10/2002 Morishima .................. 359/463

FOREIGN PATENT DOCUMENTS

| | | |
|---|---|---|
| JP | 08-322067 | * 12/1996 |
| JP | 2001-211465 | * 8/2001 |
| WO | WO 01/37579 | * 5/2001 |

* cited by examiner

*Primary Examiner*—Lun-yi Lao
(74) *Attorney, Agent, or Firm*—Fitzpatrick, Cella, Harper & Scinto

(57) ABSTRACT

In a three-dimensional image display apparatus provided with a shading mask with a minute aperture array in front of a color display device, the minute apertures are provided with color filters, a setting is provided so that the visual angles between the respective centers of the red-light transmitting part, green-light transmitting part, and blue-light transmitting part of the color filters become equal, in an identical parallax image pixel region, to the visual angles between the respective centers of the red, green, and blue sub-pixels of the color display device, the respective red, green, and blue sub-pixels are made so as to be always displayed in a lighted condition at a fixed area ratio, thus color reproduction wherein brightness ratio of the three primary colors in respective parallax image pixels is maintained at an appointed value is carried out.

20 Claims, 35 Drawing Sheets

THREE-DIMENSIONAL IMAGE DISPLAY APPARATUS AND COLOR REPRODUCING METHOD FOR THREE-DIMENSIONAL IMAGE DISPLAY

BACKGROUND OF THE INVENTION

1. Field of the Invention

The present invention relates to a three-dimensional image display apparatus using a minute aperture array and a minute light source array and a color reproducing method in a three-dimensional image display apparatus.

2. Description of the Related Art

Since three-dimensional image display apparatuses using a minute aperture array and a minute light source array have an advantage such that naked-eye stereoscopic vision can be realized with a simple structure, these have been put to practical use as parallax barrier—or linear light source array-type three-dimensional image display apparatuses.

However, pixels of a color display device which is capable of full-color display usually consist of red sub-pixels, green sub-pixels, and blue sub-pixels, therefore, if the color display device is viewed through minute apertures or lights from minute light sources are viewed through a transmission type color display device, color eclipses where only a part of a parallax image pixel composed of three red, green, and blue sub-pixels appears lighted and crosstalk occur in parallax images wherein correct color reproduction cannot be carried out. In addition, in a three-dimensional image display apparatus wherein a minute light source array is provided in the rear of a transmission type color display device, if the pixel pitch is made small to heighten resolution, crosstalk increases due to diffraction at a black matrix and scattering based on optical nonuniformity in identical sub-pixels.

Failure in correct color reproduction due to color eclipses and crosstalk becomes a great obstacle to achievement of a high sense of reality required for a three-dimensional image display apparatus.

As remedial measures thereagainst, in terms of a three-dimensional image display apparatus for displaying a three-dimensional image only with a horizontal parallax with disregard for a vertical parallax, a method using RGB horizontally-striped sub-pixels has been disclosed in International Publication WO 01/37579 A1, etc. However, in such a method, since a color display device having RGB vertically-striped sub-pixels, which has been popularized to construct a three-dimensional image display apparatus having a landscape screen, cannot be used, initial costs for commercialization become prohibitive. In addition, in a three-dimensional display apparatus using a minute light source array and a transmission type liquid crystal display, even if diffraction at a black matrix is reduced by providing RGB horizontal stripes, it is difficult to suppress scattering based on optical nonuniformity in identical sub-pixels.

SUMMARY OF THE INVENTION

The present invention is made in view of the problems involved in such prior arts and it is an object of the present invention to provide, in a three-dimensional image display apparatus using a minute aperture array or a minute light source array, a color reproducing method wherein color eclipses and crosstalk are insignificant.

In order to attain the above-described object, a color reproducing method for a three-dimensional image display in a three-dimensional image display apparatus provided with a shading mask with a minute aperture array in front of a color display device includes the following.

Each of minute aperture parts of said shading mask is provided with a color filter composed of a red-light transmitting part, a green-light transmitting part, and a blue-light transmitting part.

Herein, between said respective red-, green-, and blue-light transmitting parts of the color filters and respective red, green, and blue sub-pixels of said color display device, the light transmitting parts and the sub-pixels that have the same color and exist in a same parallax image pixel region are corresponded to each other.

And, a setting is provided so that visual angles between the respective centers of the red-light transmitting part, green-light transmitting part, and blue-light transmitting part of said color filters become equal, in an identical parallax image pixel region, to visual angles between the respective centers of the red sub-pixel, green sub-pixel, and blue sub-pixel of said color display device.

In addition, the red sub-pixel, green sub-pixel, and blue sub-pixel which belong to an identical parallax image pixel are always displayed at a fixed area ratio in a lighted condition.

Thus, at a viewing position of said three-dimensional image display apparatus at an optimal viewing distance, color reproduction is carried out while maintaining the ratio of brightness of the three RGB primary colors at a predetermined value in each of the respective parallax image pixels.

Furthermore, a color reproducing method for a three-dimensional image display in a three-dimensional image display apparatus provided with a shading mask with a minute light source array in the rear of a transmission type color display device includes the following.

Each of said light sources is composed of a red-light emitting part, a green-light emitting part, and a blue-light emitting part.

Herein, between a respective red-, green-, and blue-light emitting parts of said minute light sources and respective red, green, and blue sub-pixels of said, transmission type color display device, the light emitting parts and the sub-pixels that have the same color and exist in a same parallax image pixel region are corresponded to each other.

In addition, a setting is provided so that visual angles between the respective centers of the red-light emitting part, green-light emitting part, and blue-light emitting part of the minute light sources become equal, in an identical parallax image pixel region, to visual angles between the respective centers of the red sub-pixel, green sub-pixel, and blue sub-pixel of the transmission type color display device.

And, the red sub-pixel, green sub-pixel, and blue sub-pixel which belong to an identical parallax image pixel are always displayed at a fixed area ratio in a lighted condition.

Thus, at a viewing position of said three-dimensional image display apparatus at an optimal viewing distance, color reproduction is carried out while maintaining the ratio of brightness of the three RGB primary colors at a predetermined value in each of the respective parallax images.

Furthermore, a three-dimensional image display apparatus includes the following.

a transmission type display device, a minute light source array arranged in the rear of the transmission type display device, a positive microlens array arranged between the minute light source array and said transmission type display device and a shading mask with a minute aperture array.

Herein, minute aperture parts of the shading mask are provided at respective positions of real images of minute light sources of the minute light source array, formed by the microlens array in front of said transmission display device.

Furthermore, a three-dimensional image apparatus includes the following.

a display device which has pixel units each composed of sub-pixels of a plurality of colors arranged in the horizontal direction and each being a unit of display, and which displays two or more parallax images in a composite manner so that approximately identical sections of said two or more parallax images which have been each divided into a plurality of sections in the horizontal direction are arranged by a predetermined order, and a mask in which aperture parts and shading parts are alternatively provided in the horizontal direction and which allows lights from pixel units for displaying respective sections of a same parallax image out of all of the pixel units to reach, through said aperture parts, observation regions which are different depending on the parallax image.

Herein, on each of the aperture parts of the mask, a filter unit composed of color filters of a plurality of colors which are arranged in the horizontal direction is provided.

Furthermore, a three-dimensional image display apparatus includes the following.

a display device which has pixel units each composed of a plurality of sub-pixels which allow lights of mutually different colors to transmit arranged in the horizontal direction and each being a unit of display, and which displays two or more parallax images in a composite manner so that approximately identical sections of said two or more parallax images which have been each divided into a plurality of sections in the horizontal direction are arranged by a predetermined order, and a light source array in which light-emitting parts and non-light-emitting parts are alternatively provided in the horizontal direction and which illuminates said display device so that lights from pixel units for displaying respective sections of a same parallax image out all of said pixel units reach observation regions which are different depending on the parallax image.

Herein, the light emitting parts of the light source array are each constructed by arranging a plurality of light sources which emit lights of mutually different colors in the horizontal direction.

DETAILED DESCRIPTION OF THE PREFERRED EMBODIMENTS

Hereinafter, various embodiments of the present invention will be described based on the drawings.

Figure 1:
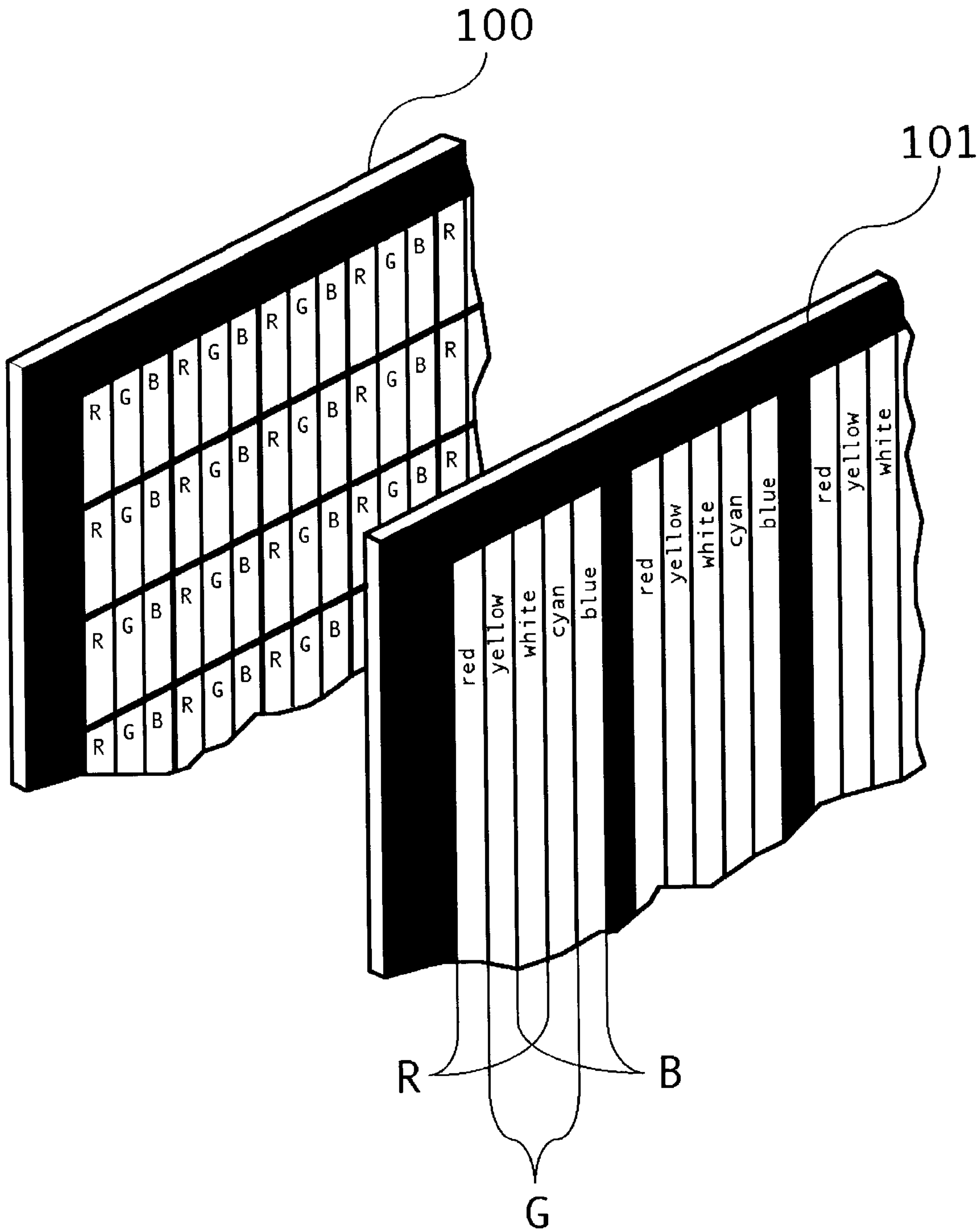
FIG. 1 is an explanatory diagram of a three-dimensional image display apparatus according to a first embodiment of the present invention.

FIG. 1 shows an embodiment (first embodiment) of the present invention, wherein 100 denotes a color display device, and 101 denotes a shading mask with a minute aperture array.

Lights from pixels on the color display device 100 transmit through the shading mask 101 with a minute aperture array and reach an observer's eye (not shown).

Red lights from red sub-pixels indicated as "R" in FIG. 1 transmit through only red-light transmitting parts of the shading mask 101 with a minute aperture array, namely, respective parts of red, yellow, and white (transparent and colorless), and are shielded at respective colored parts of cyan and blue and black mask parts. Therefore, with respect to the red sub-pixels on the color display device 100, the shading mask 101 with a minute aperture array functions in a similar manner to a parallax barrier having, as a slit width, a width of one set of adjacent red, yellow, and white.

Figure 4:
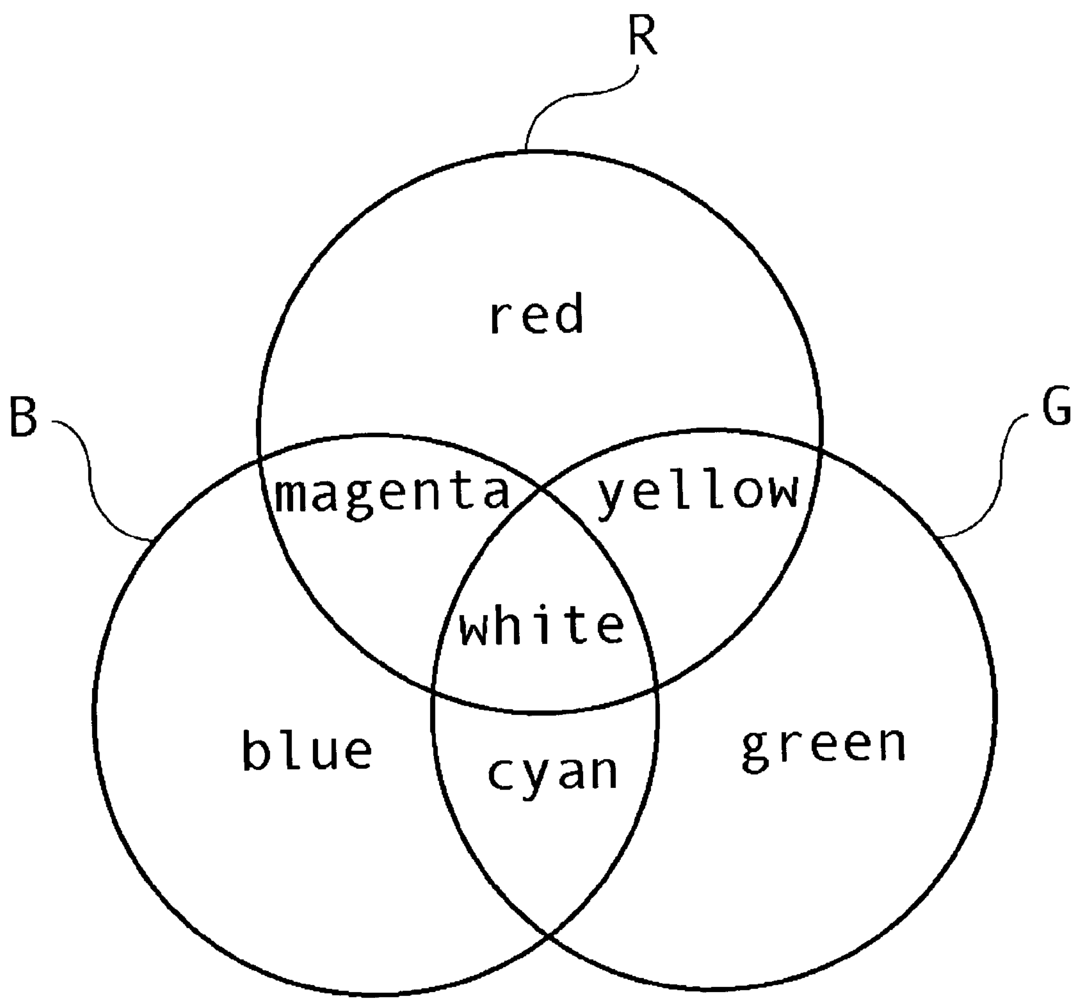
FIG. 4 is an explanatory diagram illustrating an additive color mixing method for three primary colors of light, FIGS. 5(*a*) and 5(*b*) are explanatory diagrams of color eclipses in a prior three-dimensional image display apparatus.

The reason that such a thing is possible is because, as shown in FIG. 4, according to an additive color mixing method for three primary colors of light, yellow and white include red but cyan and blue do not include red.

The same is true of lights from green sub-pixels indicated as "G" in FIG. 1 and lights from blue sub-pixels indicated as "B" in FIG. 1.

Figure 2:
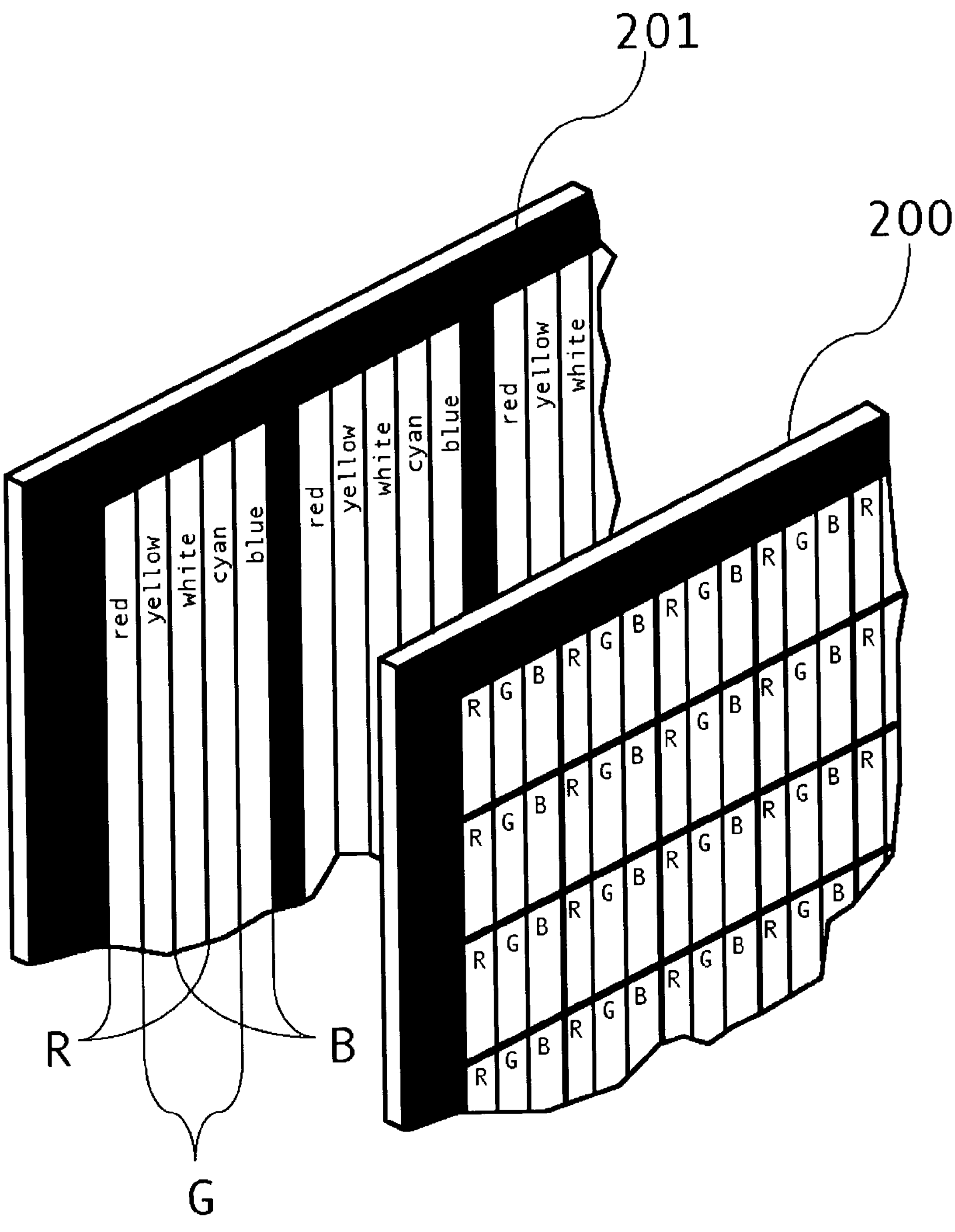
FIG. 2 is an explanatory diagram of a three-dimensional image display apparatus according to a second embodiment of the present invention.

FIG. 2 shows another embodiment (second embodiment) of the present invention, wherein 200 denotes a transmission type color display device, and 201 denotes a minute light source array.

Lights from the minute light source array 201 transmit through the transmission type color display device 200 and reach an observer's eye (not shown).

Lights from respective light-emitting parts of red, yellow, and white of the minute light source array 201 are lights which include red lights according to the additive color mixing method shown in FIG. 4 and, therefore, can transmit through red sub-pixels on the transmission type color display device 200 as red lights, whereas lights from respective light-emitting parts of cyan and blue do not include red lights and, therefore, cannot transmit through the red sub-pixels. Therefore, with respect to the red sub-pixels on the transmission type color display device 200, the minute light source array 201 functions in a similar manner to a white linear light source array having, as a linear light source width, a width of one set of adjacent red, yellow, and white.

The same is true of lights which transmit through green sub-pixels indicated as "G" in FIG. 2 and lights which transmit through blue sub-pixels indicated as "B" in FIG. 2.

According to the color reproducing method for a three-dimensional image display of FIG. 1 and FIG. 2, in a three-dimensional image display apparatus using a minute aperture array or a minute light source array, color reproduction wherein color eclipses and crosstalk are insignificant can be carried out.

Figure 5A:
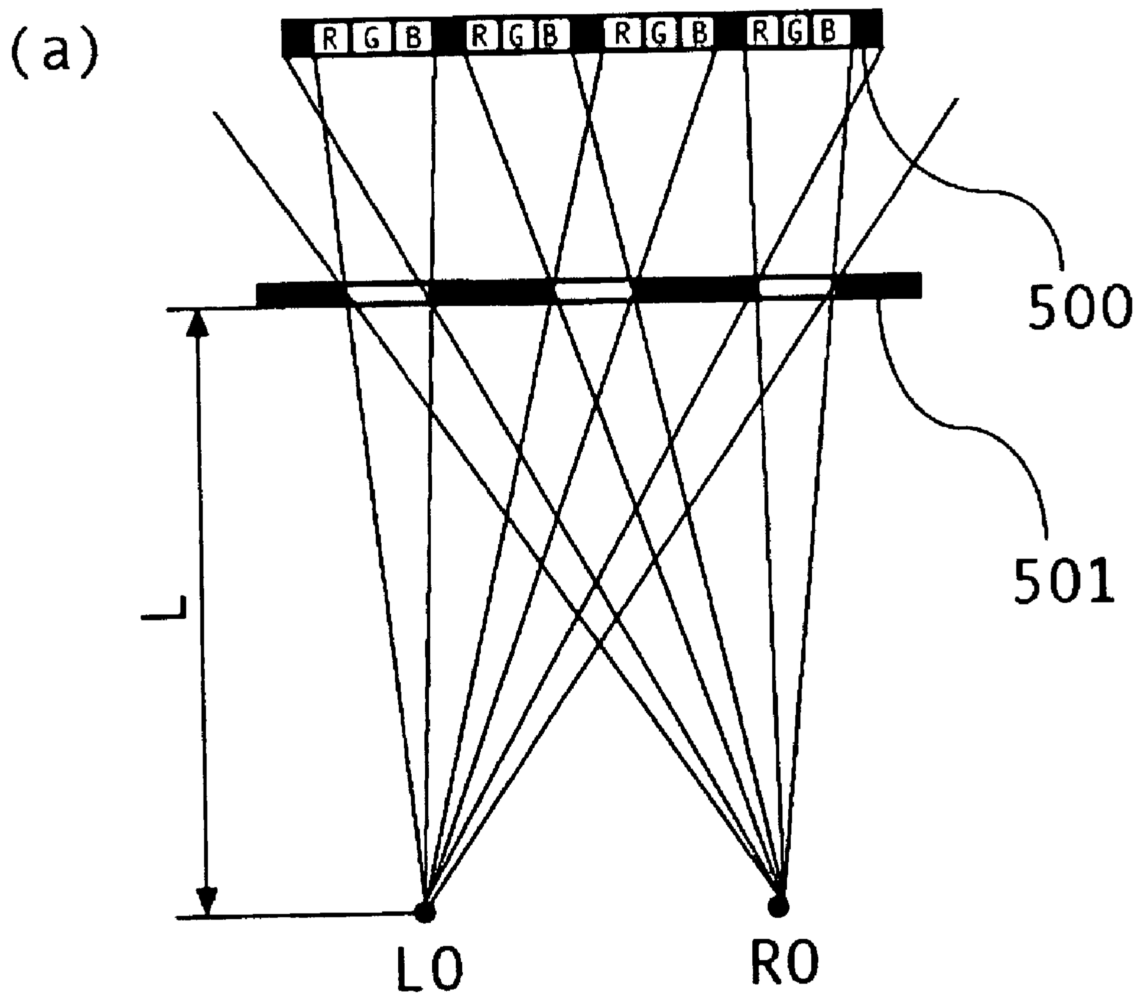
Figure 5B:
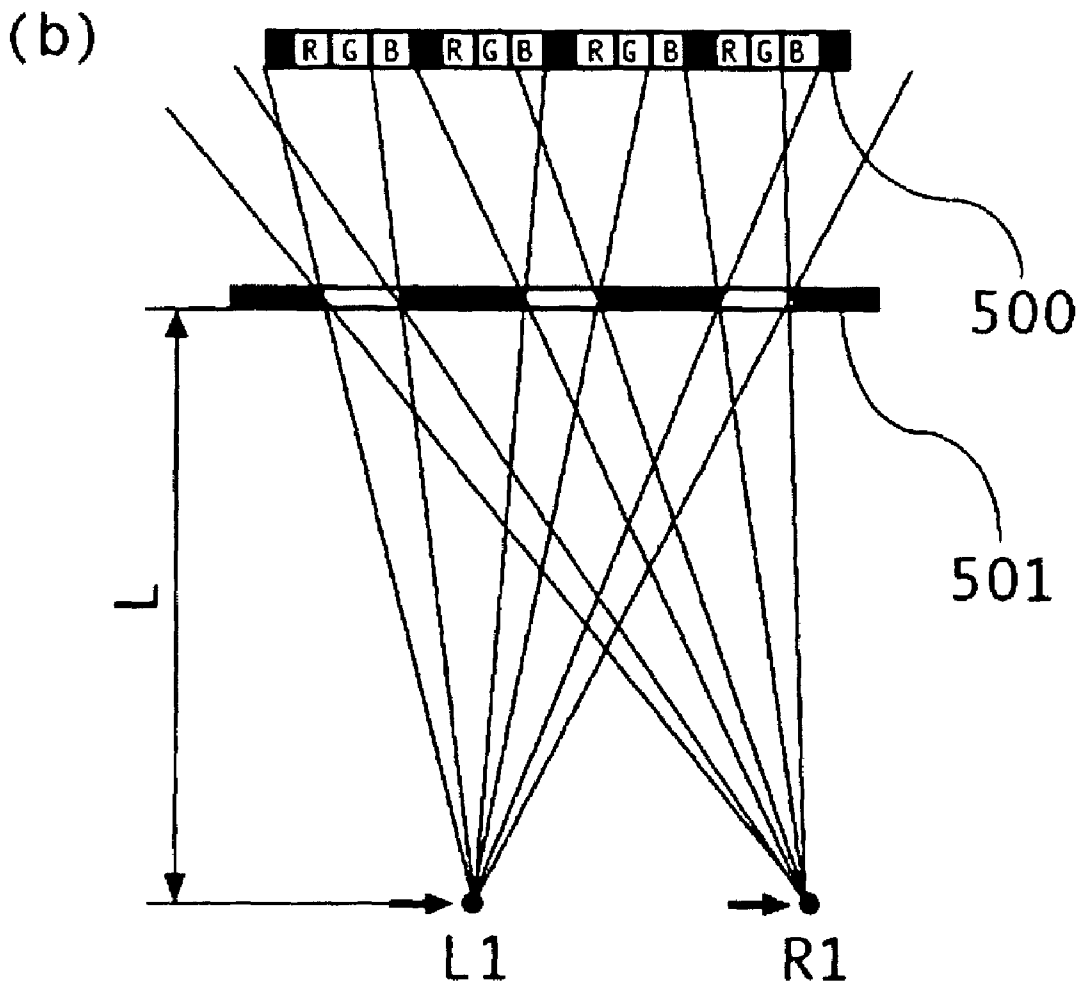

FIG. 5(*a*) and FIG. 5(*b*) are diagrams for explaining color eclipses which occur in a prior parallax barrier-type three-dimensional image display apparatus. FIG. 5(*a*) shows a condition where an observer distant from a three-dimensional image display apparatus by a best viewing distance L observes the three-dimensional image display apparatus from a central position. In this case, from a viewpoint L0 and a viewpoint R0, respective parallax images correctly color-reproduced can be observed.

On the other hand, FIG. 5(*b*) shows a condition where an observer observes a three-dimensional image display apparatus from a viewpoint L1 and a viewpoint R1 that are distant from the three-dimensional image display apparatus by a best viewing distance L but are shifted rightwards from the center. In this case, parallax images observed from the viewpoint L1 and the viewpoint R1 are lacking in blue lights.

These phenomena are called color eclipses. In addition, when the viewpoints are further shifted to the right, crosstalk occurs, and also in these crosstalk images, red lights, green lights and the like are lacking. As such, an observation of parallax images whose color balance has been lost due to color eclipses and cross talk considerably deteriorates, in particular, in a multi-viewpoint image display, quality of an image observed from an intermediate viewpoint located between adjacent optimal viewpoints.

Figure 6:
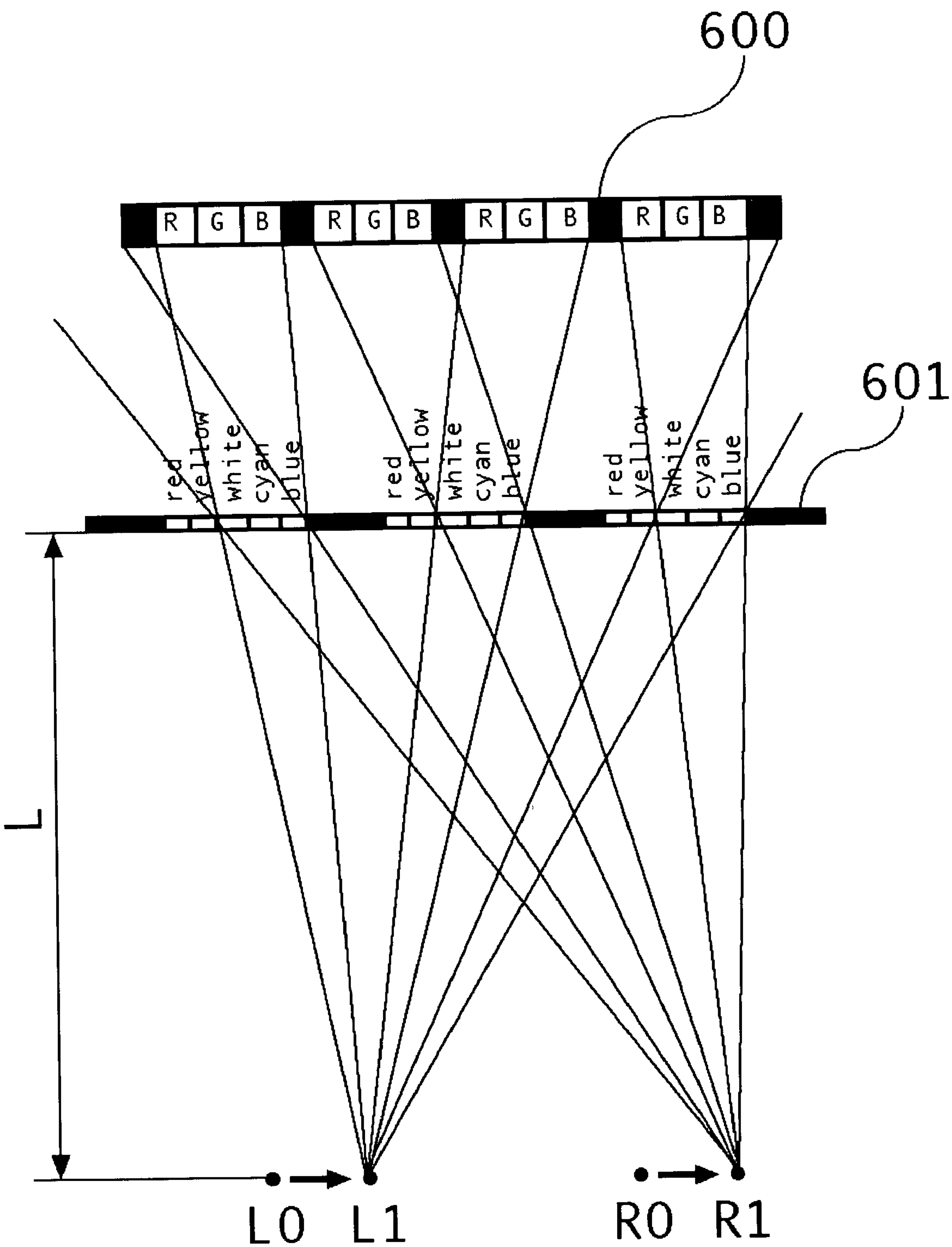
FIG. 6 is an explanatory diagram showing that color eclipses are restrained by a color reproducing method of the present invention.

FIG. 6 is an explanatory diagram of a color reproducing method for a three-dimensional image display of the present invention, wherein 600 denotes a color display device, and 601 denotes a shading mask with a minute aperture array. In FIG. 6, similar to FIG. 5(*b*), shown is a condition where an observer observes a three-dimensional image display apparatus from a viewpoint L1 and a viewpoint R1 that are distant from the three-dimensional image display apparatus by an optimal viewing distance L and are shifted rightward from the center. In this case, unlike FIG. 5(*b*), no color eclipses occur in parallax images observed from the viewpoint L1 and the view point R1.

Then, even when the viewpoints are shifted further to the right, the areas of red sub-pixels, green sub-pixels, and blue sub-pixels which appear lightened are reduced while maintaining a fixed area ratio, therefore, color balance of the parallax image pixels is not lost. In addition, a region where observation of a correctly color-reproduced three-dimensional image is possible is also expanded. Furthermore, since crosstalk images which have been correctly color-reproduced in detail are produced, in a multi-viewpoint image display, an image observed from an intermediate viewpoint located between adjacent optimal viewpoints is prevented from losing color balance, whereby a satisfactory motion parallax can be reproduced.

Figure 3:
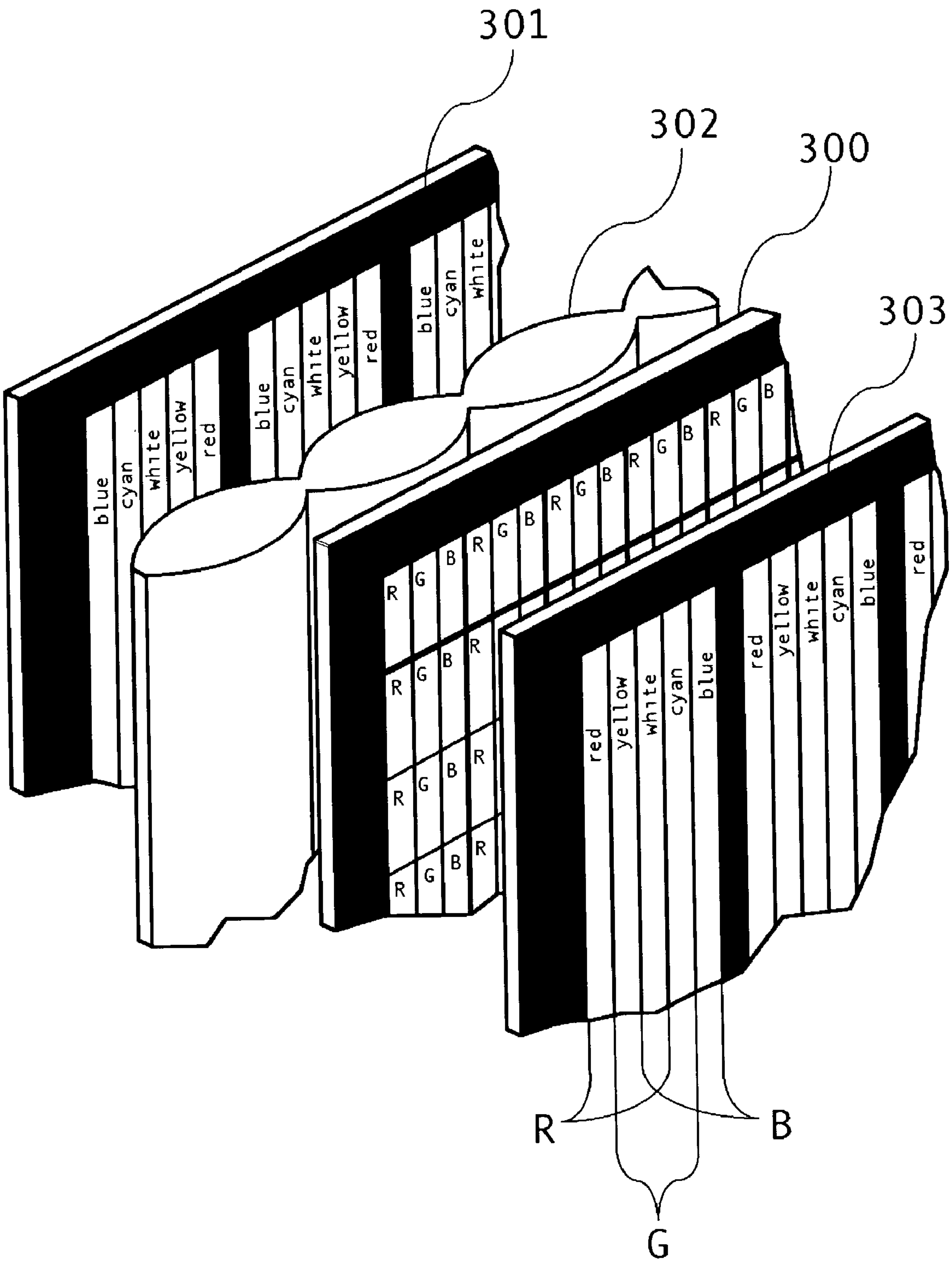
FIG. 3 is an explanatory diagram of a three-dimensional image display apparatus according to a third embodiment of the present invention.

FIG. 3 is an explanatory diagram of still another embodiment (third embodiment) of the present invention, wherein 300 denotes a color display device, 301 denotes a minute light source array, 302 denotes a cylindrical lens array which consists of cylindrical lenses having a generating line in the vertical direction, and 303 denotes a shading mask with a minute aperture array.

Lights from the minute light source array 301 form, by lens actions in terms of a horizontal section of the cylindrical lens array 302, real images in front of the transmission type color display device 300. The shading mask 303 with a minute aperture array has been arranged on real images of the minute light source array 301 in terms of a horizontal section and colored so as to coincide with a geometrical-optical real image of the minute light source array 301.

Lights from respective light-emitting parts of red, yellow, and white of the minute light source array 301 are, by lens actions of the cylindrical lens array 302, condensed in the vicinity of respective colored parts of red, yellow, and white of the shading mask 303 with a minute aperture array, and these lights are lights which include red lights according to the additive color mixing method shown in FIG. 4. Accordingly, the lights transmit through red sub-pixels of the transmission type color display device 300 and further transmit through the respective colored parts of red, yellow, and white of the shading mask 303 with a minute aperture array as red lights and reach an observer's eye (not shown). In addition, through the same processes, green lights transmit through the respective colored parts of yellow, white, and cyan of the shading mask 303 with a minute aperture array, and blue lights transmit through the respective colored parts of white, cyan, and blue of the shading mask 303 with a minute aperture array and reach an observer's eye.

Herein, the part which consists of the transmission type color display device 300 and the shading mask 303 with a minute aperture array shown in FIG. 3 has the same construction as in the first embodiment of the present invention shown in FIG. 1.

However, in the three-dimensional image display apparatus of FIG. 3, since lights from the minute light source array 301 can be concentrated to corresponding colored parts of the shading mask 303 with a minute aperture array, if a self-luminous minute light source array is utilized, utilization efficiency of light can be remarkably improved compared to the mode shown in FIG. 1.

In addition, in the embodiment shown in FIG. 3, similar to the embodiment shown in FIG. 2, the minute light source array 201/301 is placed in the rear of the transmission type color display device 200/300, and since scattered lights which occur at the transmission type color display device 200/300 can be shielded, it is possible to display a three-dimensional image by means of a transmission type color display device having resolution that is by far higher than that of the embodiment shown in FIG. 2.

Figure 7:
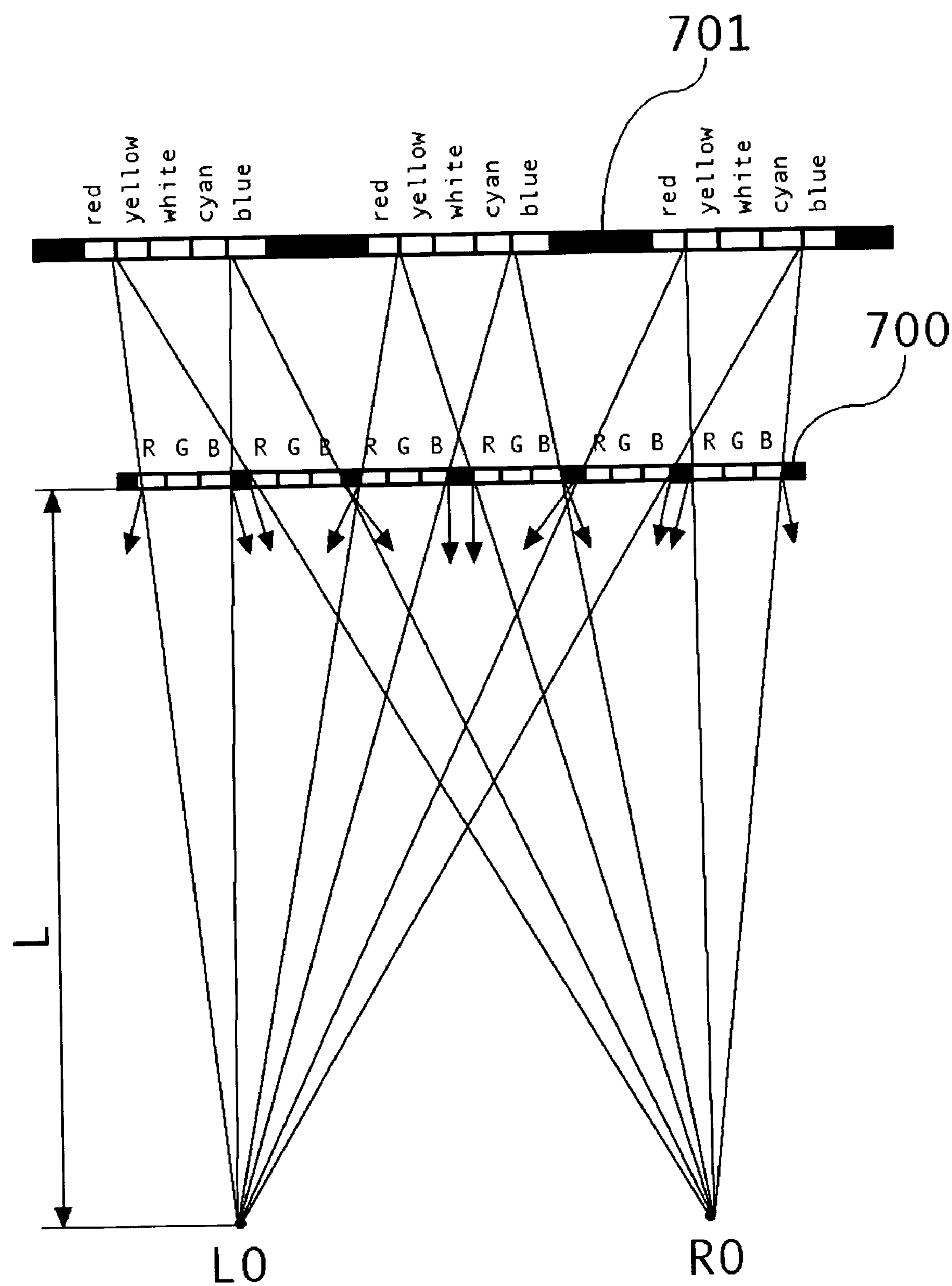
FIG. 7 is an explanatory diagram showing light courses in a second embodiment of the present invention.

FIG. 7 shows light courses in the embodiment shown in FIG. 2. In FIG. 7, scattered lights shown by small arrows which occur at a transmission type color display device 700 are directly observed by an observer, therefore, in the embodiment shown in FIG. 2, crosstalk due to scattering occurs.

Figure 8:
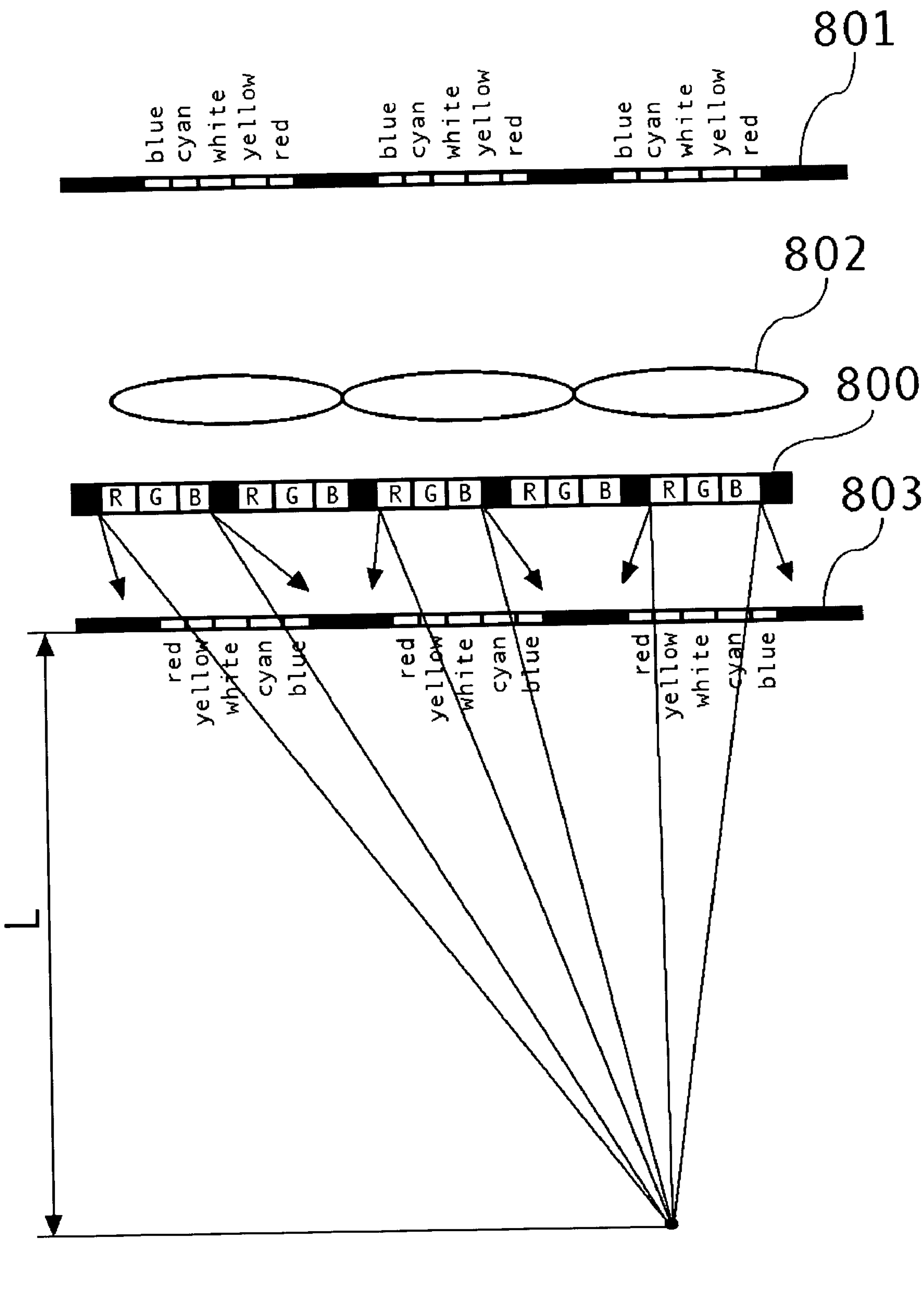
FIG. 8 is an explanatory diagram showing light courses in a third embodiment of the present invention.

FIG. 8 shows light courses in the embodiment shown in FIG. 3. In FIG. 8, scattered lights shown by small arrows which occur in a transmission type color display device 800 are shielded by a shading mask 803 with a minute aperture array, therefore, compared with the embodiment shown in FIG. 2, in the embodiment shown in FIG. 3, crosstalk due to scattering can be greatly suppressed.

Figure 9:
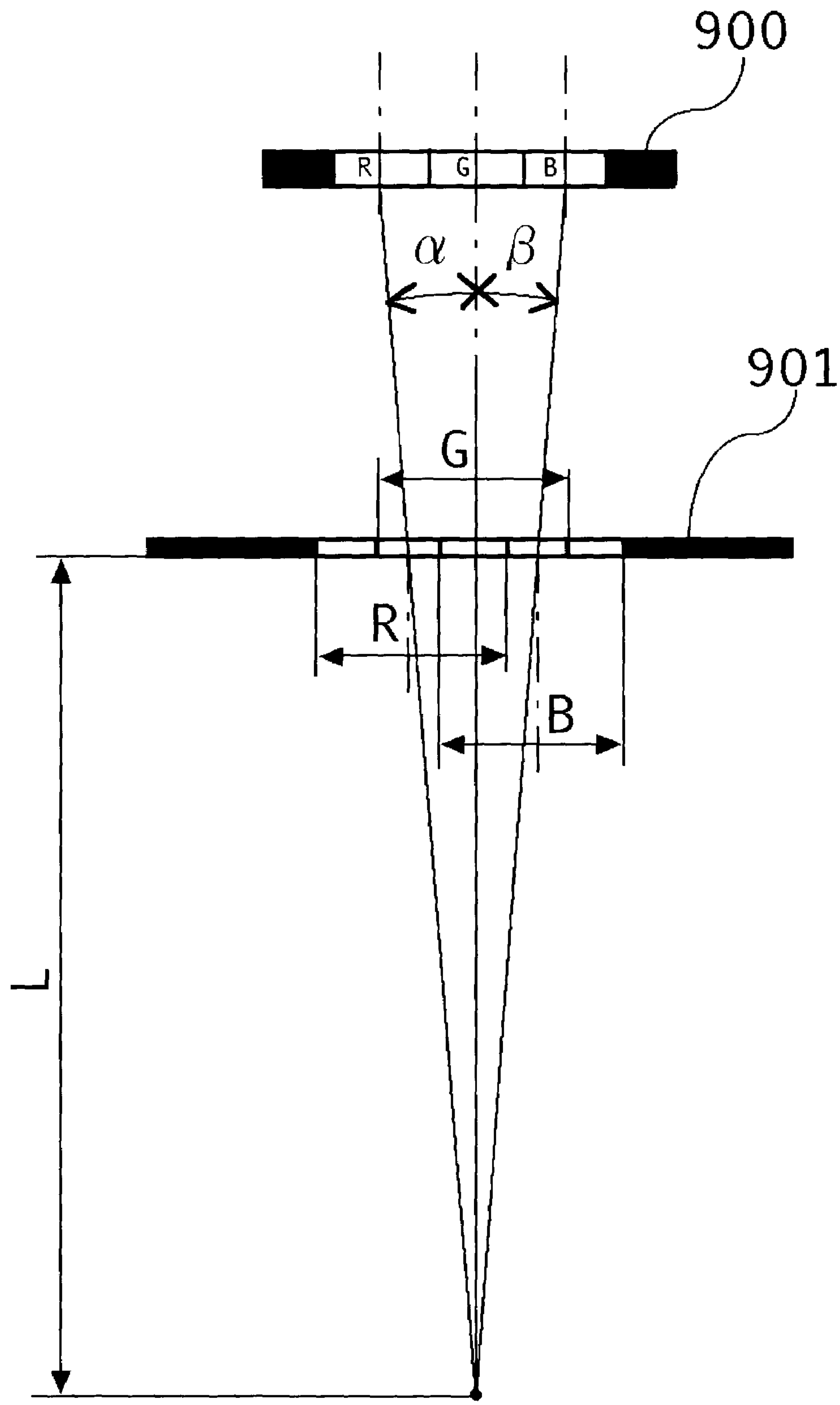
FIG. 9 is an explanatory diagram showing a relationship between RGB sub-pixels and color filters in a first embodiment.

FIG. 9 shows a relationship between the respective red, green, and blue sub-pixels of a color display device 900 and color filter colored parts of a shading mask 901 with a minute aperture array in the embodiment shown in FIG. 1. In FIG. 9, as shown by visual angles $\alpha$ and $\beta$, in the embodiment shown in FIG. 1, a setting is provided so that the visual angles between the respective centers of the red sub-pixel, green sub-pixel, and blue sub-pixel become equal, in an identical parallax image pixel region, to the respectively corresponding visual angles between the respective centers of the red-light transmitting part, green-light transmitting part, and blue-light transmitting part of the color filters. Thereby, for an observer who carries out an observation at an optimal viewing distance from a three-dimensional image display apparatus, the red sub-pixel, green sub-pixel, and blue sub-pixel which belong to an identical parallax image pixel can be always displayed in a lighted condition at a fixed area ratio.

Also, in the embodiment shown in FIG. 2, a setting is provided so that the visual angles between the respective centers of the red sub-pixel, green sub-pixel, and blue sub-pixel become equal, in an identical parallax image pixel region, to the respectively corresponding visual angles between the respective centers of the red-light emitting part, green-light emitting part, and blue-light emitting part of the minute light sources, whereby for an observer which carries out an observation at an optimal viewing distance from a three-dimensional image display apparatus, the red sub-pixel, green sub-pixel, and blue sub-pixel which belong to an identical parallax image pixel can be always displayed in a lighted condition at a fixed area ratio.

Figure 10:
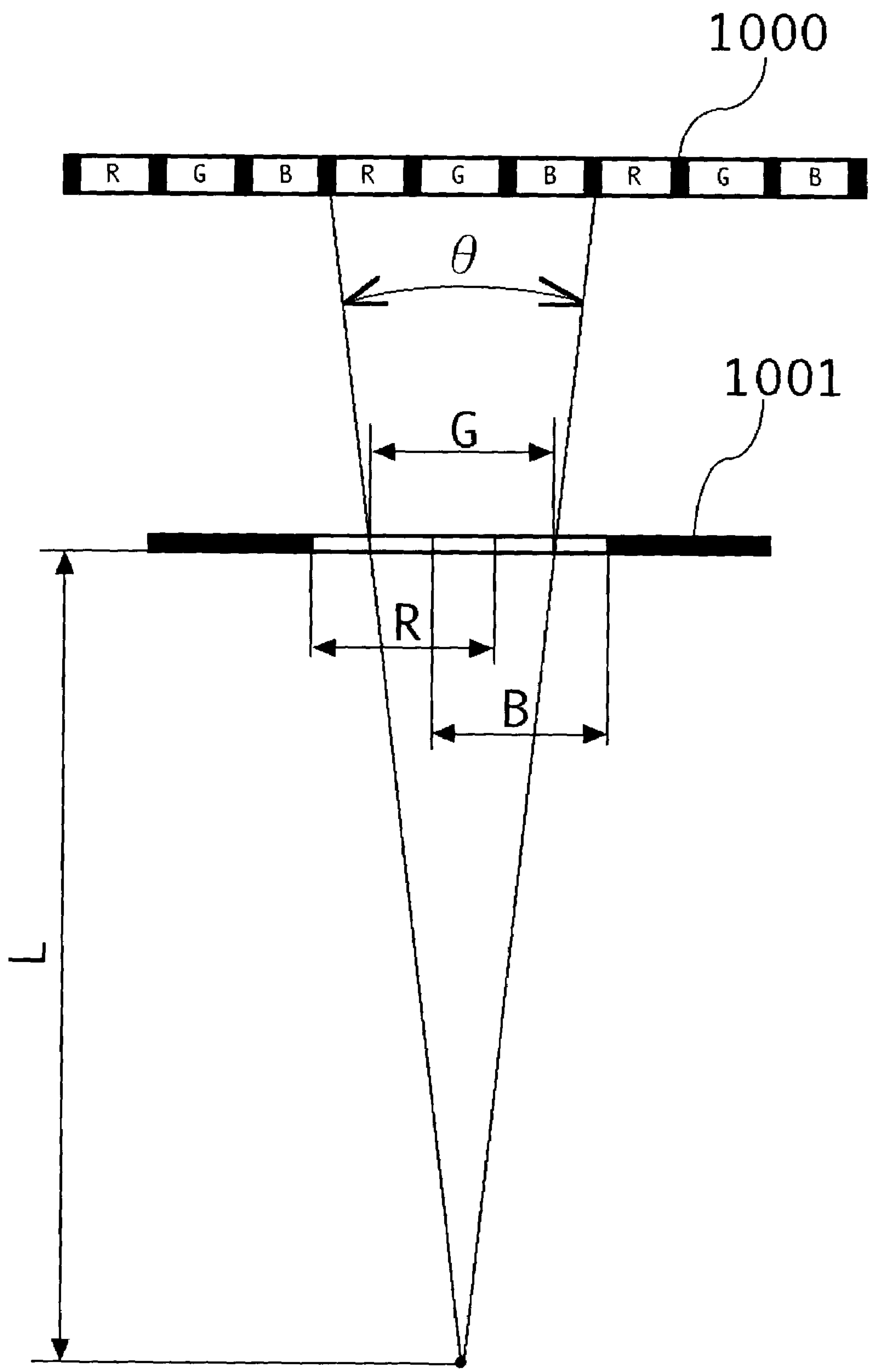
FIG. 10 is an explanatory diagram showing a relationship between pixels of a color display device and color filters in a first embodiment.

FIG. 10 shows a relationship between the pixels of a color display device 1000 and color filter colored parts of a shading mask 1001 with a minute aperture array. In FIG. 10, a relationship between the pixels of the color display device 1000 and color filter colored parts is set so that when an observer observes a three-dimensional display apparatus at an optimal viewing distance, the pixel pitch of the color display device 1000 and the width of the red-light transmitting part R of the color filter, the width of the green-light transmitting part G, and the width of the blue-light transmitting part B are observed with an equal visual angle $\theta$ in a direction where the respective three primary colors are lined in an identical parallax image pixel region. Thereby, an extreme change in the amount of light by shifting of viewpoint within a surface at an optimal viewing distance from a three-dimensional image display apparatus can be prevented, therefore, in particular, in a multi-viewpoint image display, a smooth motion parallax can be displayed.

In FIG. 10, a case of the embodiment shown in FIG. 1 is shown, however, restraining the amount of light from changing by a method equivalent hereto is effective in the second embodiment as well. Namely, it is satisfactory to provide a setting so that, in FIG. 2, when an observer observes a three-dimensional image display apparatus at an optimal viewing distance, the pixel pitch of the transmission type color display device 200 and the width of a red-light emitting unit R which consists of minute red, yellow, and white light sources, the width of a green-light emitting unit G which consists of minute yellow, white, and cyan light sources, and the width of a blue-light emitting unit B which consists of minute white, cyan, and blue light sources are observed with an equal visual angle in a direction where the respective primary colors are lined in an identical parallax image pixel region.

Figure 11:
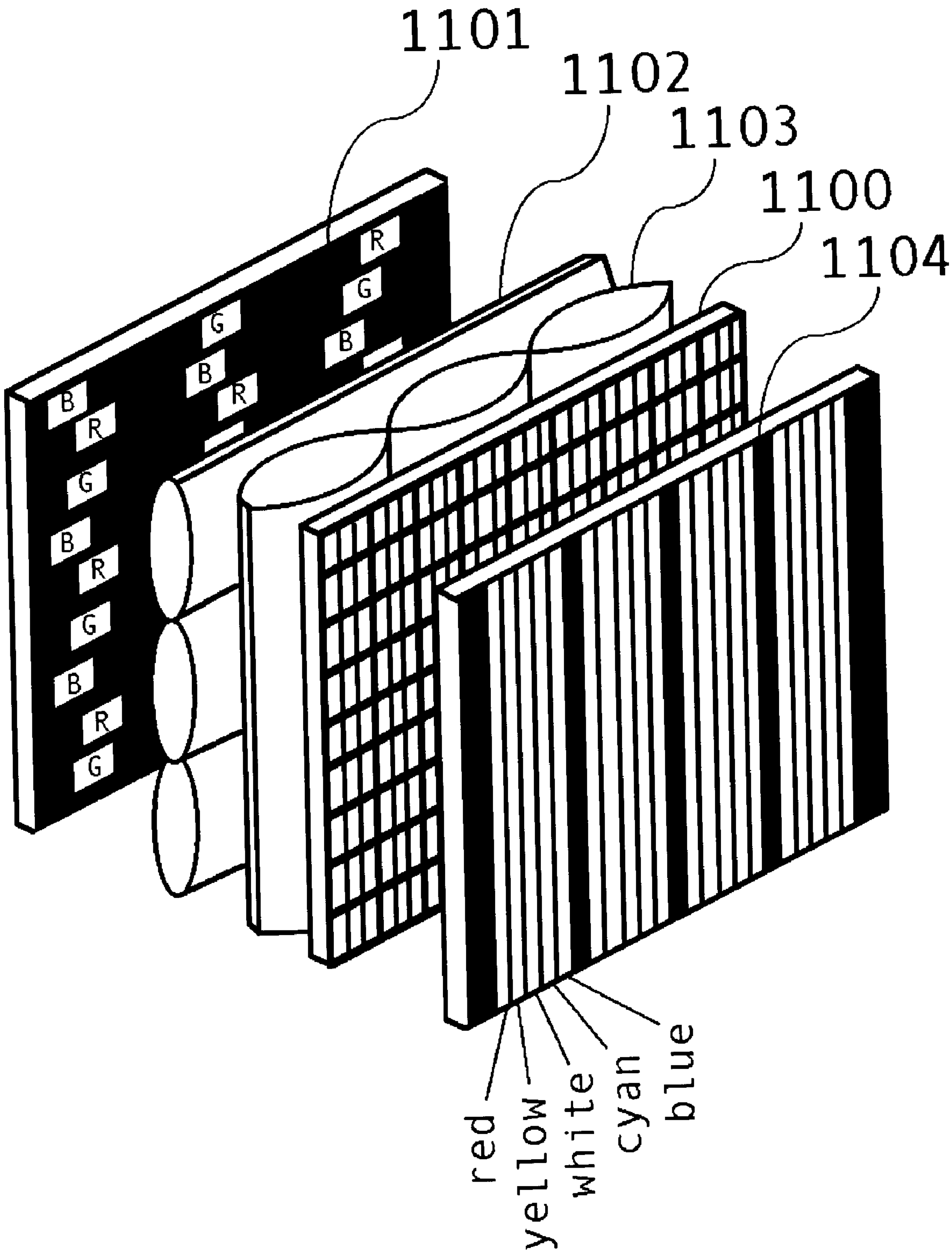
FIG. 11 is an explanatory diagram showing a developed mode of a third embodiment, FIG. 12(*a*) is a detailed explanatory diagram of the three-dimensional image display apparatus of FIG. 1, FIG. 12(*b*) is an explanatory diagram of a shading mask with a minute aperture array, FIG. 12(*c*) is an explanatory diagram of composite parallax images displayed on a display device.

FIG. 11 is an explanatory diagram for a case where a color reproducing method of the present invention has been applied to a three-dimensional image display apparatus according to International Publication WO 01/37579 A1 a pending patent application by the present inventor.

In the construction of FIG. 11, a cylindrical lens array 1102 having a generating line in the horizontal direction is added to the construction of FIG. 3, whereby it becomes possible to arrange the red-light emitting parts, the green-light emitting parts, and the blue-light emitting parts of the minute light source array in a separate manner in the vertical direction. Therefore, in this mode, it is possible to construct the minute light source array by arranging monochrome light emitting elements such as LEDs. Since the three-dimensional image display apparatus according to International Publication WO 01/37579 A1 has an advantage such that a high display efficiency can be obtained by arranging the respective parallax image pixels in a matrix shape for display, if the color reproducing method of the present invention is applied thereto to add an advantage such that color reproduction wherein color eclipses and crosstalk are insignificant can be carried out, a high-resolution and high-quality multi-viewpoint image display (multi-view image display) becomes possible.

The embodiment described in the above is for a case where the color reproducing method of the present invention has been applied to a three-dimensional image display apparatus having a parallax in only the horizontal direction. However, as a matter of course, the color reproducing method of the present invention can also be applied to a three-dimensional image display apparatus which is provided with a pinhole-like minute aperture array and a dot-like minute light source array and has parallaxes in both the horizontal direction and vertical direction.

NUMERICAL EXAMPLE 1

Figure 12A:
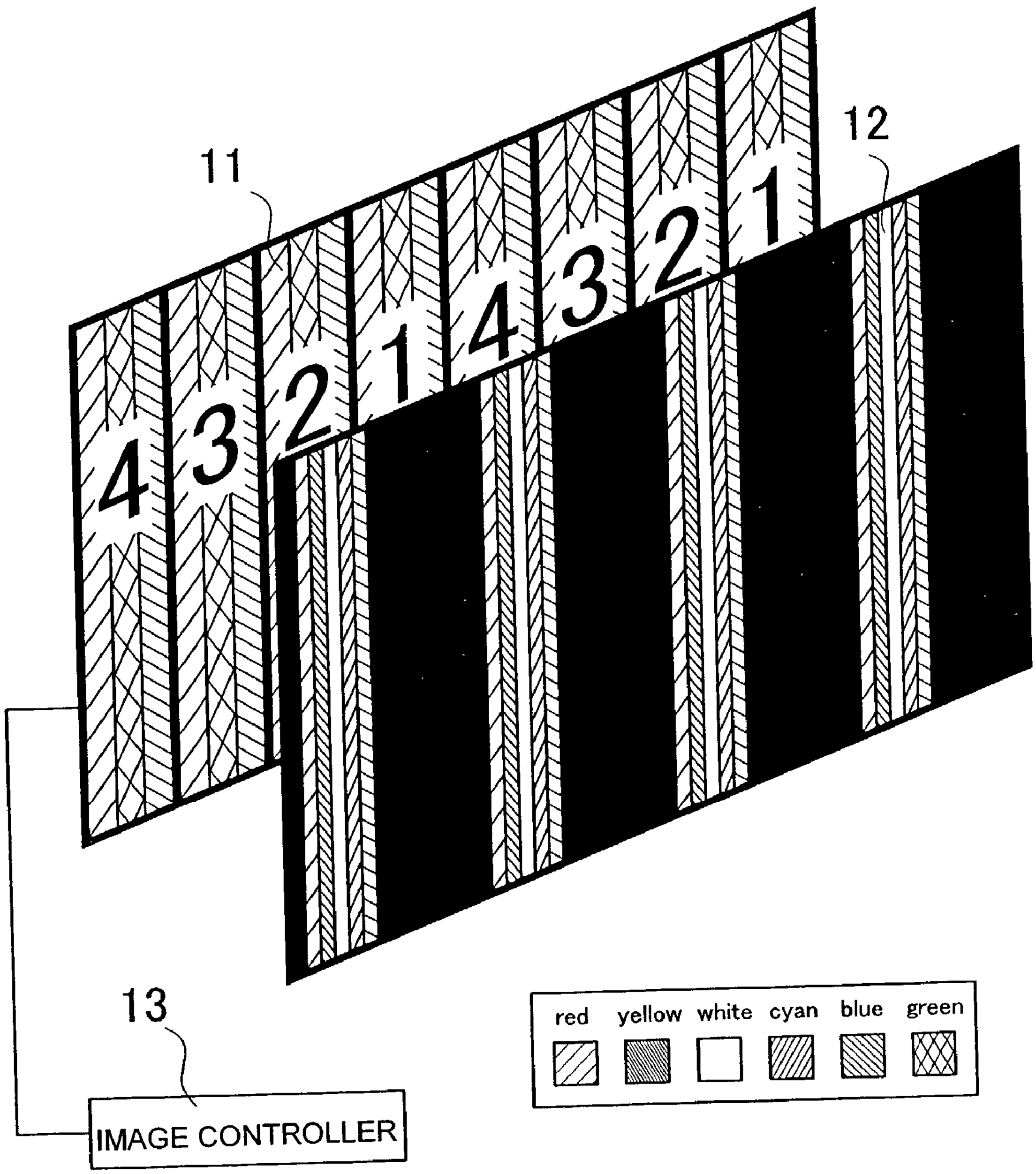
Figure 12B:
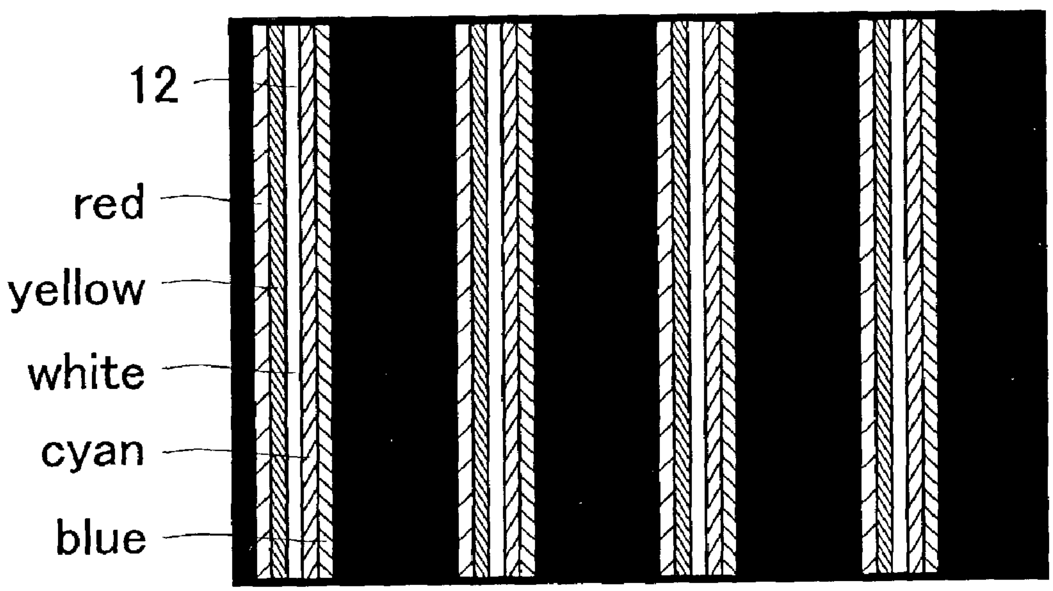
Figure 12C:
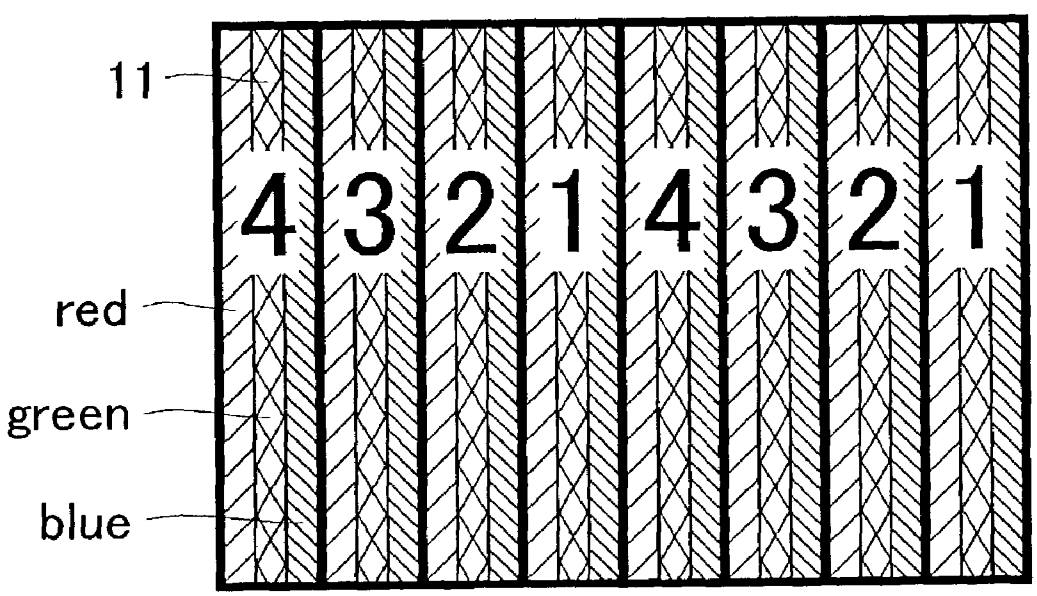

FIG. 12(*a*) is a detailed explanatory diagram of the three-dimensional image display apparatus shown in FIG. 1.

A display device 11 is composed of vertically-striped RGB sub-pixels (a pixel unit as a unit of display), and as such a display device, a liquid crystal display, a plasma display, etc., can be mentioned. A shading mask 12 with a minute aperture array is provided on the display surface side (in front of) of the display device 11.

FIG. 12(*b*) is an explanatory diagram of the shading mask 12 with a minute aperture array.

The shading mask 12 with a minute aperture array is composed of shading parts shown by black paint and minute aperture parts having five types of vertically-striped color filters of red, yellow, white (or transparent), cyan, and blue. The shading parts and the minute aperture parts are alternatively provided in the horizontal direction.

An image controller 13 is connected to the display device 11, and by the image controller 13, display of a composite parallax image is controlled.

FIG. 12(*c*) is an explanatory diagram of a composite parallax image displayed on the display device 11.

The illustrated numerals 1 through 4 show what number parallax image it is, and in the present embodiment, the number of parallax images is provided as 4. A composite parallax image is an image wherein four parallax images are decomposed into vertical stripes in sets of RGB sub-pixels (pixel unit), and vertically-striped images prepared by four parallax images are repeatedly adhered together from the left of the illustration in order of 4, 3, 2, 1, 4, 3, 2, 1, 4 . . . so that images of approximately identical parts are adjacent to each other.

Figure 13:
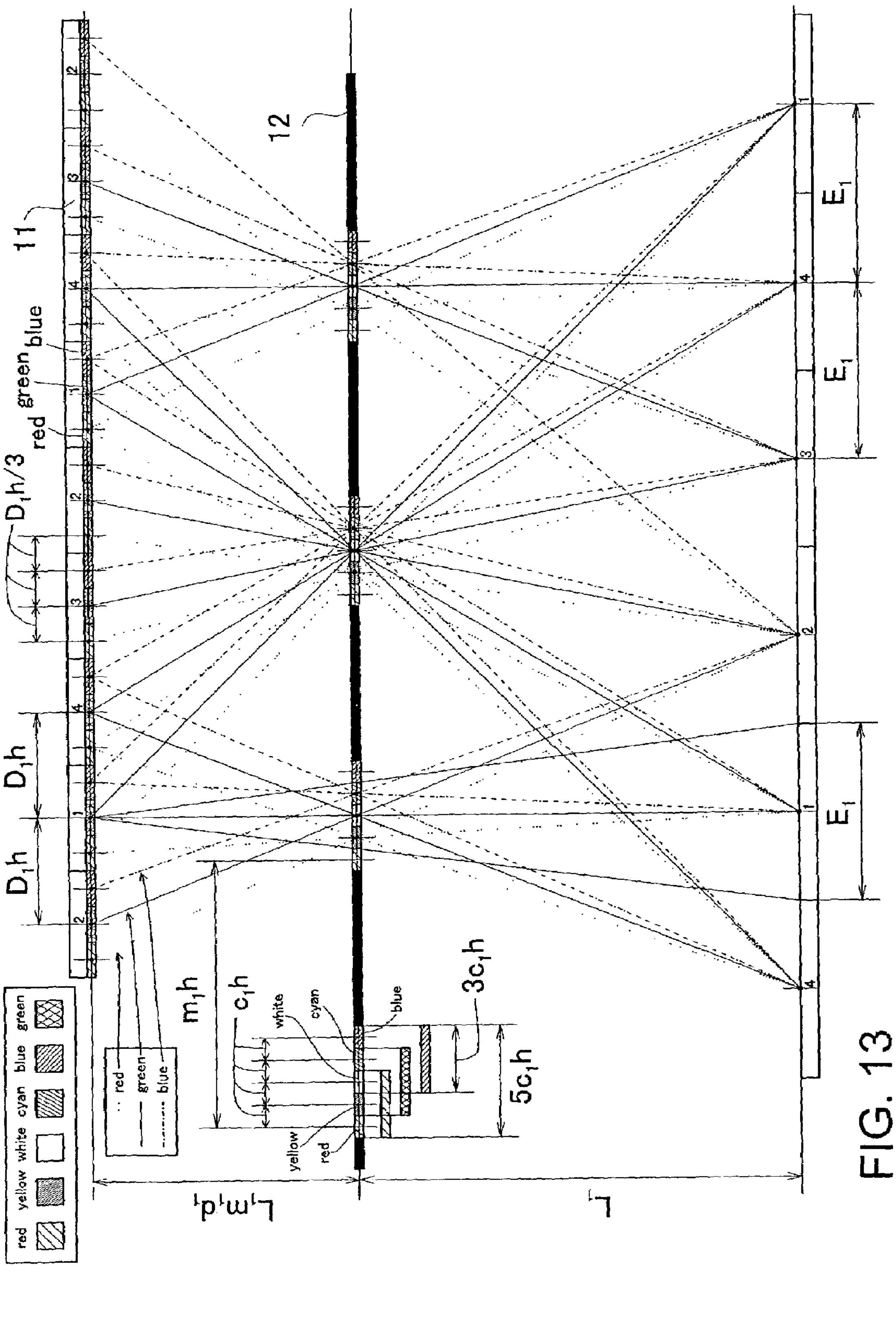
FIG. 13 is a horizontal sectional diagram of a three-dimensional image display apparatus of a numerical example 1 of the present invention.

FIG. 13 is a horizontal sectional diagram of a three-dimensional image display apparatus of the present invention, which explains a positional relationship between the display device 11, shading mask 12 with a minute aperture array, and an optimal viewing position (observation region).

The numerals 1 through 4 marked on the respective pixels (pixel units) of the display device 11 show what number parallax image it is.

In addition, the numerals 1 through 4 marked on the optimal viewing position show what number parallax image it is, and the dots (black spots) show the center points of the respective parallax images in the horizontal direction.

At this time, in order to exhibit a composite parallax image displayed on the display device 11 at the optimal viewing position in a separate manner, the respective components must satisfy geometric relationships hereinafter prescribed.

The center point of each R sub-pixel of the display device 11 (the dots marked on the R sub-pixels of FIG. 13), the center point of color filters through which a light from each R sub-pixel can transmit (since the light transmits through the red, yellow, and white filters, the center point of the yellow filter=the dot marked on the yellow filter of FIG. 13), and the center point of a parallax image corresponding to each R sub-pixel at the optimal viewing position lie in a straight line.

Similarly, in terms of C sub-pixels, as well, the center point of each G sub-pixel (the dots marked on the G sub-pixels of FIG. 13), the center point of color filters through which a light from each G sub-pixel can transmit (since the light transmits through the yellow, white, and cyan filters, the center point of the white filter=the dot marked on the white filter of FIG. 13), and the center point of a parallax image corresponding to each G sub-pixel at the optical viewing position lie in a straight line.

Similarly, in terms of B sub-pixels, as well, the center point of each B sub-pixel (the dots marked on the B sub-pixels of FIG. 13), the center point of color filters through which a light from each B sub-pixel can transmit (since the light transmits through the white, cyan, and blue filters, the center point of the cyan filter=the dot marked on the cyan filter of FIG. 13), and the center point of a parallax image corresponding to each B sub-pixel at the optical viewing position lie in a straight line.

Herein, in terms of the display device 11, where
- the horizontal pitch of one pixel (pixel unit) is provided as $D_1h$,
- the horizontal pitch of one sub-pixel is provided as $D_1h/3$, in terms of the shading mask 12 with a minute aperture array, where
- the horizontal pitch of each color filter part is provided as $c_1h$,
- the horizontal width of all color filter parts in a filter unit is provided as $5c_1h$,
- the horizontal width of a region through which a light from an R sub-pixel can transmit is provided as $3c_1h$,
- the horizontal width of a region through which a light from a G sub-pixel can transmit is provided as $3c_1h$,
- the horizontal width of a region through which a light from a B sub-pixel can transmit is provided as $3c_1h$,
- with a shading part and an aperture of five types of color filters as a mask unit, the repeating pitch of the mask units in the horizontal direction is provided as $m_1h$, the distance between the display device 11 and shading mask 12 with a minute aperture array is provided as $L_1m_1d_1$, the distance from the shading mask 12 with a minute aperture array to the optimal viewing position is provided as $L_1$, the horizontal pitch at which respective parallax images are formed at the optimal viewing position is provided as $E_1$, the following expressions are obtained:

$$D_1h:E_1=L_1m_1d_1:L_1 \quad (1)$$

$$D_1h/3:c_1h=L_1m_1d_1+L_1:L_1 \quad (2)$$

$$E_1:3c_1h=L_1m_1d_1+L_1:L_1m_1d_1 \quad (3)$$

where the number of parallax images is provided as N (in the present example, N=4), $$N\times E_1:m_1h=L_1m_1d_1+L_1:L_1m_1d_1 \quad (4)$$

FIG. 14 explain an improvement in color eclipses in detail.

In FIG. 14(*a*), a light from the R sub-pixel of the parallax image 2 of the display device 11 transmits through transmittable color filters (red, yellow, and white filters) and becomes a viewing light having a width $e_1$ at the optimal viewing position.

Similarly, in terms of G sub-pixels, as well, a light from the B sub-pixel of the parallax image 2 transmits through transmittable color filters (yellow, white, and cyan filters) and becomes a viewing light having a width $e_1$ at the optimal viewing position.

Similarly, in terms of B sub-pixels, as well, a light from the G sub-pixel of the parallax image 2 transmits through transmittable color filters (white, cyan, and blue filters) and becomes a viewing light having a width $e_1$ at the optimal viewing position.

At this time, lights from these RGB sub-pixels are overlapped at an identical position (region) in the horizontal direction of the optimal viewing position.

Therefore, in the aforementioned region having a width $e_1$, since the RGB lights are mixed in a well-balanced manner, no color eclipses occur. Such a relationship is similarly obtained in other parallax images.

FIG. 14(*b*) shows a relationship of lights which transmit through adjacent mask unit and reach the optimal viewing position. Similar to FIG. 14(*a*), in this case, as well, the lights from these RGB sub-pixels are overlapped at an identical position in the horizontal direction of the optimal viewing position, and in the region having a width $e_1$, the RGB lights are mixed in a well-balanced manner, therefore, no color eclipses occur. Such a relationship is similarly obtained in other parallax images.

In addition, in the present example, since the center sub-pixel of a vertically striped image prepared from a parallax image is provided as a G sub-pixel, as color filters, five types of color filters of red, yellow, white (or transparent), cyan, and blue are used. However, if an R sub-pixel is situated in the center, five types of color filters of blue, magenta, white, yellow, and green may be used, and if a B sub-pixel is situated in the center, five types of color filters of green, cyan, white, magenta, and red may be used. Furthermore, by means of a display composed of vertically striped yellow, cyan, and magenta sub-pixels, a three-dimensional image display apparatus of the present invention can also be constructed by the same techniques.

Herein, where the intersection of straight lines between both end portions in the horizontal direction of an R sub-pixel of the display device 11 and both end portions of transmittable color filters (red, yellow, and white filters) is provided as $f_1$, the distance between $f_1$ and the display device 11 is provided as $L_1f_1d_1$, the distance between $f_1$ and the shading mask 12 with a minute aperture array is provided as $L_1m_1f_1$, the following expressions are obtained:

in a prior three-dimensional image display apparatus, $$e_1:3c_1h=L_1+L_1m_1f_1:L_1m_1f_1 \quad 5$$

$$L_1m_1d_1=L_1f_1d_1+L_1m_1f_1 \quad 6$$

$$D_1h/3:3c_1h=L_1f_1d_1:L_1m_1f_1 \quad 7$$

$$D_1h/3:e_1=L_1f_1d_1:L_1+L_1m_1f_1 \quad 7'$$

However, the expressions 7 and 7' have a dependent relationship and it is sufficient that either thereof is obtained.

The above is an example in the case where the aperture ratio in the horizontal direction of pixels of the display device 11 and the aperture ratio in the horizontal direction of the shading part and the aperture part of five types of color filters of the shading mask 12 with a minute aperture array are both provided as 100%. In general, in a display device, since black matrices exist at the boundaries between sub-pixels, the ratio of aperture of pixels is less than 100%.

Figure 15:
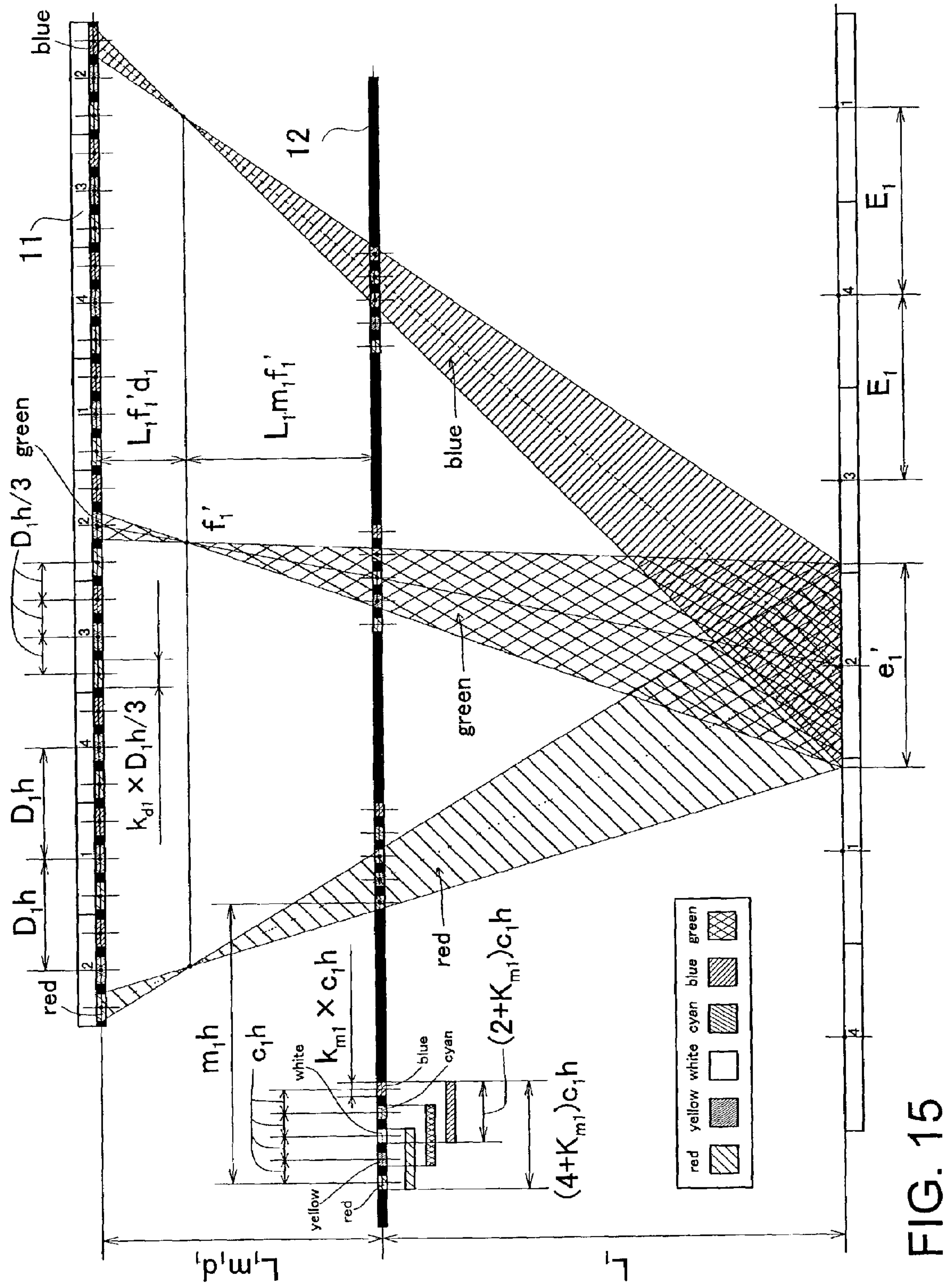
FIG. 15 is a horizontal sectional digital of a three-dimensioned image display apparatus of a modified numerical example 1 of the present of the invention.

FIG. 15 shows a case where the aperture ratio of pixels of the display device 11 is provided as $kd_1$, and the aperture ratio in the horizontal direction of the color filters of the shading mask 12 with a minute aperture array is provided as $km_1$.

Herein, where the intersection of straight lines between both end portions in the horizontal direction of an R sub-pixel of the display device 11 and both end portions of transmittable color filters (red, yellow, and white filters) is provided as $f_1'$, the distance between $f_1'$ and the display device 11 is provided as $L_1f_1d_1$, the distance between $f_1'$ and the shading mask 12 with a minute aperture array is provided as $L_1m_1f_1'$, the width in the horizontal direction of each parallax image which reaches the optimal viewing position is provided as $e_1'$, the following expressions are obtained:

$$e_1':(km_1+2)\times c_1h=L_1+L_1m_1f_1':L_1m_1f_1' \quad 8$$

$$L_1m_1d_1=L_1f_1'd_1+L_1m_1f_1' \quad 9$$

$$kd_1\times D_1h/3: (km_1+2)\times c_1h=L_1f_1d_1:L_1m_1f_1' \quad 10$$

$$kd_1\times D_1h/3:e_1'=L_1f_1'd_1:L_1+L_1m_1f_1' \quad 10'$$

However, the expressions 10 and 10' have a dependent relationship and it is sufficient that either thereof is obtained.

In addition, $e_1$ of FIG. 14 and $e_1'$ of FIG. 15 are both set so as to become larger in some degree than $E_1$. This shows that a crosstalk region where respective adjacent parallax images at the optimal viewing position are overlapped with each other is included.

Figure 16:
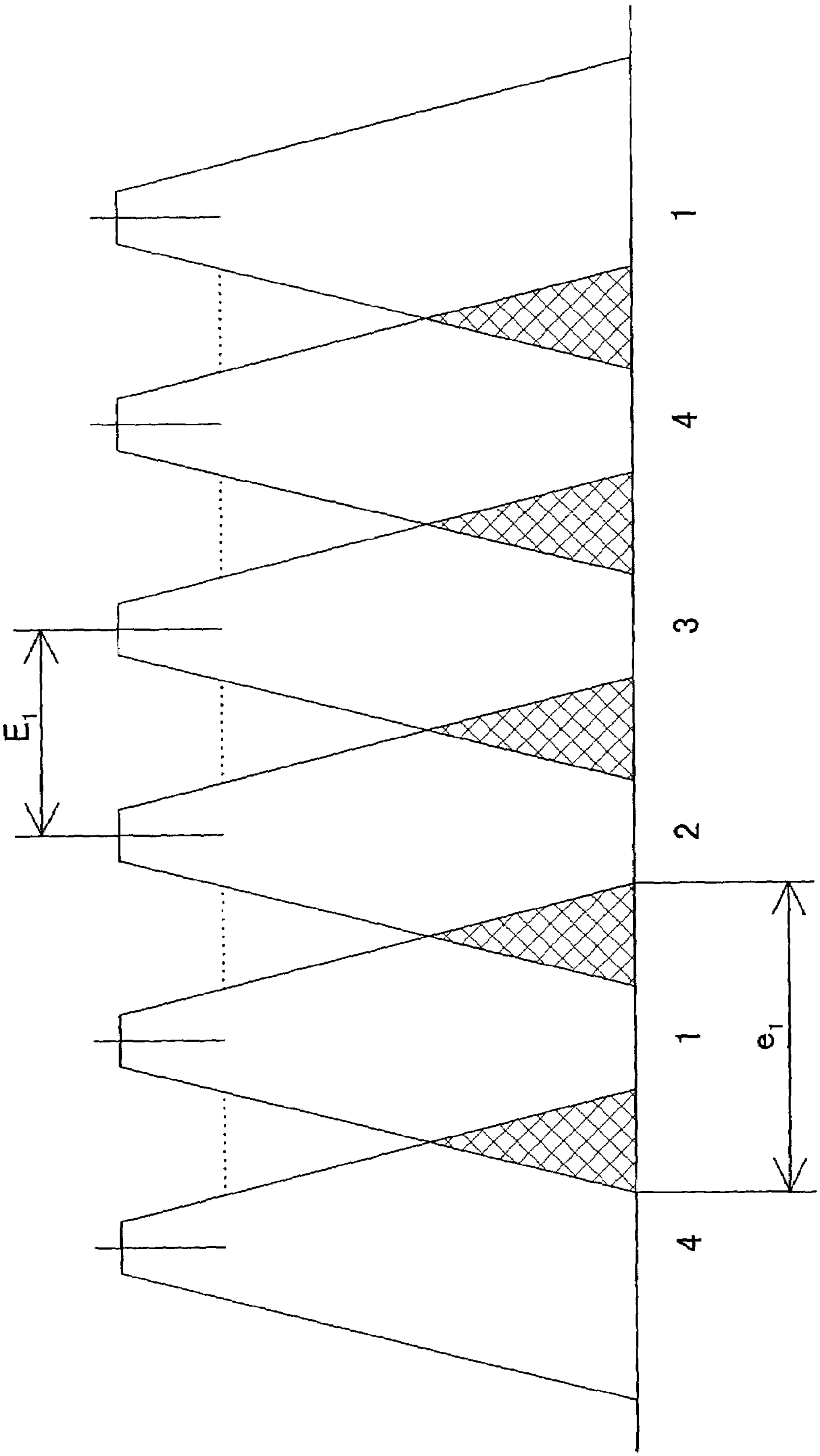
FIG. 16 shows a luminance distribution in the horizontal direction of respective parallax images at the optimal viewing position of the numerical example 1 of the present invention.

FIG. 16 shows a luminance distribution in the horizontal direction of respective parallax images at the optimal viewing position. The distribution of each parallax image becomes maximum around the center of the viewing position of each image, and parts thereof are overlapped with adjacent images as shown by hatching portions in the drawing. In such overlapping regions, adjacent images are overlapped with each other, therefore, a light distribution with a luminance shown by dotted lines is perceived by an observer. As a result, at the optimal viewing position, images with an average luminance are distributed, and no excessive unevenness in luminance occurs. In addition, it is also possible to set the luminance shown by the dotted lines to around the maximum value of luminance distribution of the respective parallax images, and in this case, even if the observer shifts in the horizontal direction, no unevenness in luminance occurs.

In such a case, as in the present invention, where the number of parallax images to be displayed is more than two (in the present example, four parallax images), if parallax images which are continuous in the horizontal direction are used, it is possible to express a motion parallax according to the shift of the observer. Furthermore, by providing the aforementioned crosstalk regions, a smoothly changing motion parallax without creating unevenness in luminance can be expressed, and this is particularly preferable.

It is possible to set, by the aforementioned setting of the aperture ratios $kd_1$ and $km_1$, the value of such $e_1$ to either $e_1=E_1$ or $e_1<E_1$, however, in a case of a three-dimensional image display apparatus for displaying multiple parallax images, it is particularly desirable to set the value of $e_1$ to $E_1$ or more.

NUMERICAL EXAMPLE 2

Figure 17:
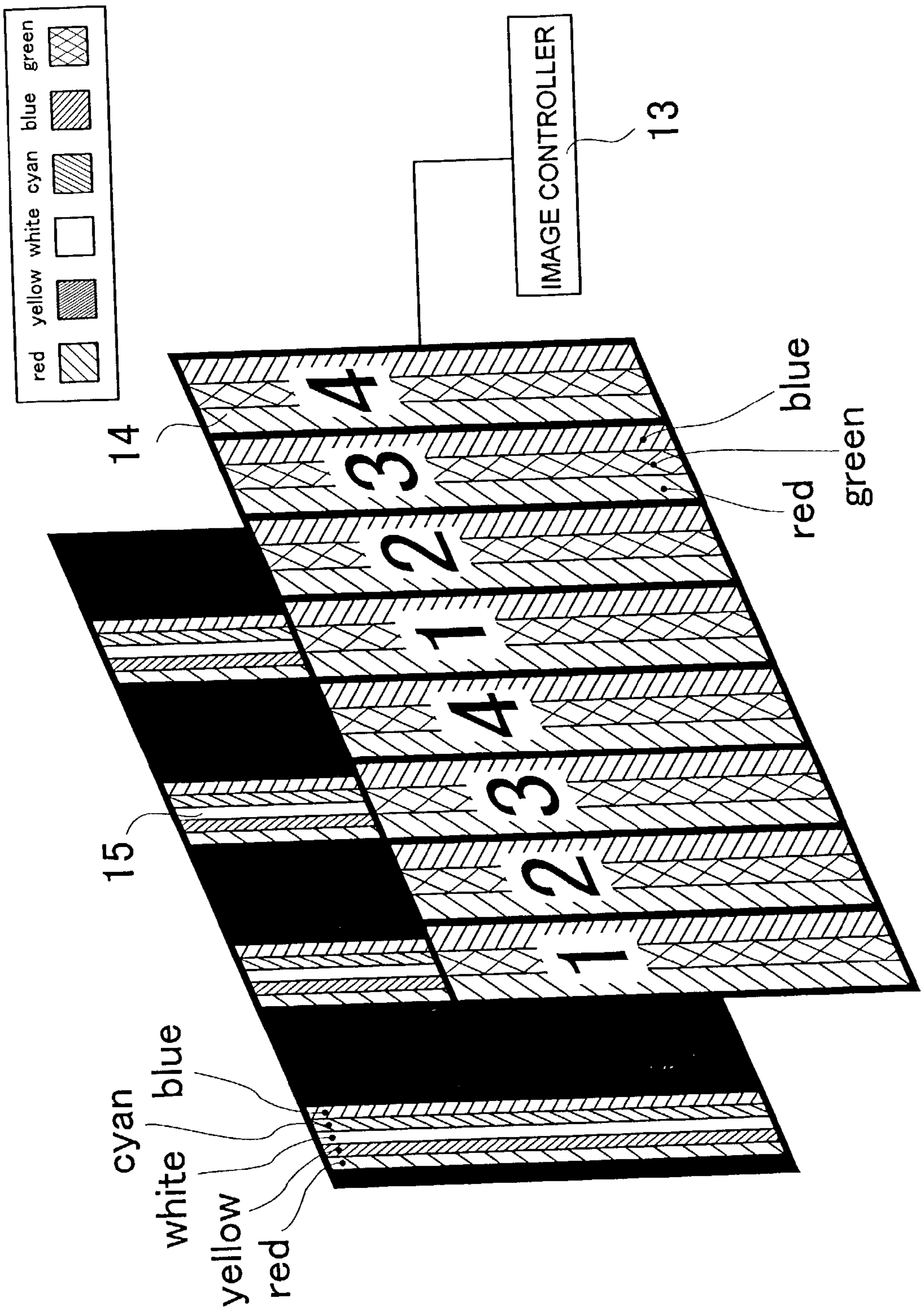
FIG. 17 is an explanatory diagram of the three-dimensional image display apparatus of a numerical example 2 of the present invention.

FIG. 17 is a detailed explanatory diagram of a three-dimensional image display apparatus of FIG. 2.

A transmission type display device 14 is composed of vertically-striped RGB sub-pixels, and as such a display device, a liquid crystal display, etc., can be mentioned.

On the rear surface side (the side opposite to the viewing surface) of the transmission type display device 14, a minute light source array 15 is provided.

The minute light source array 15 is composed of shading parts (non-light-emitting parts) shown by black painting and light source parts (light-emitting parts) five types of vertically-striped light source of red, yellow, white, cyan, and blue. The shading parts and the light source parts are alternatively provided in the horizontal direction.

It is also possible to construct such a light source array by use of a white backlight and a color filter mask with a pattern of a shading part and color filter part of vertically-striped red, yellow, white, cyan, and blue as shown in the minute light source array 15.

An image controller 13 is connected to the transmission type display device 14 and display of a composite parallax image is controlled by the image controller 13.

The composite parallax image is prepared similarly to that described in terms of FIG. 12(*c*) and is, in the present example, an image prepared by repeatedly adhering four parallax images together from the right of the illustration in order of 4, 3, 2, 1, 4, 3, 2, 1, 4.

Figure 18:
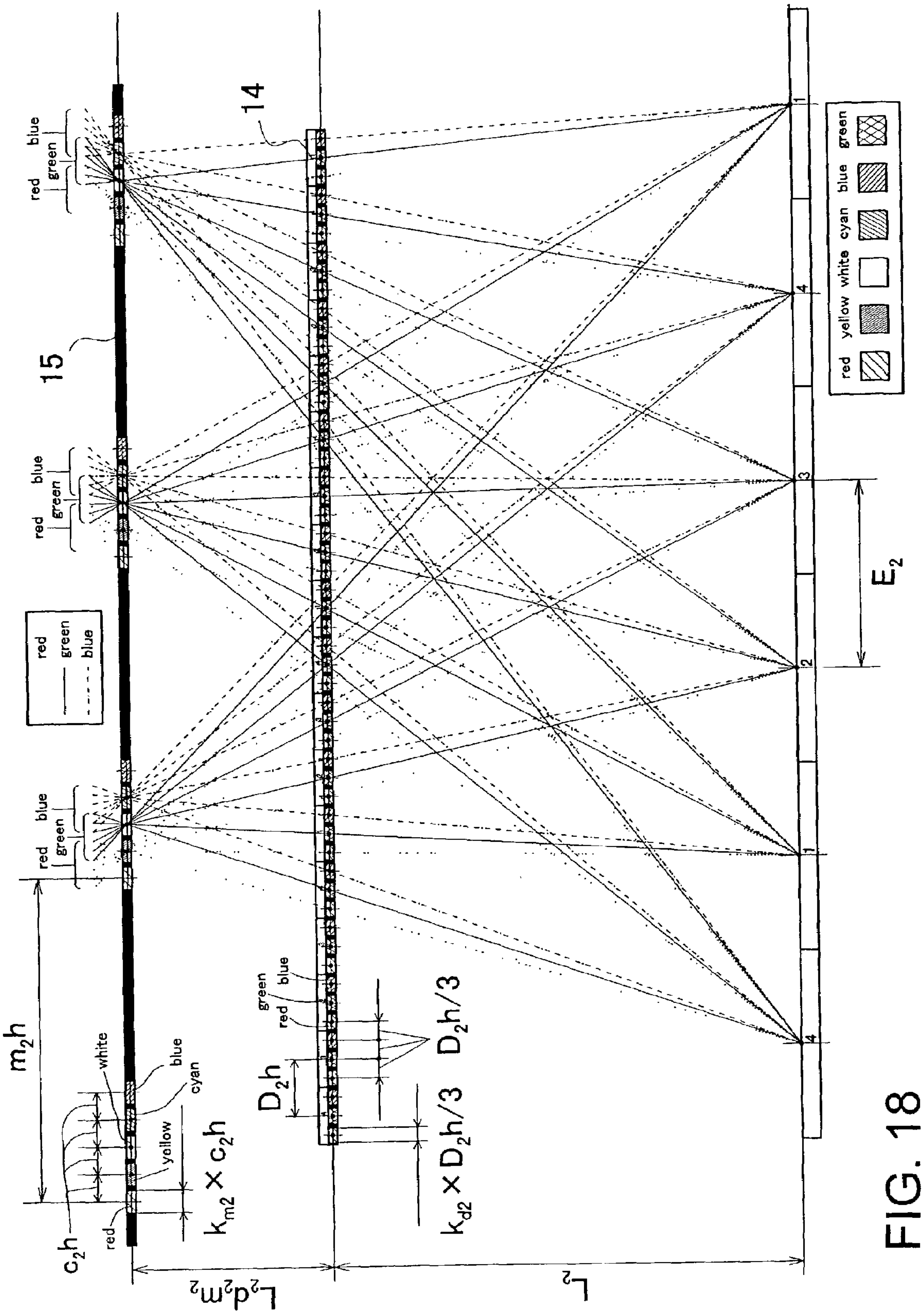
FIG. 18 and FIG. 19 are horizontal sectional diagrams of a three-dimensional image display apparatus of the numerical example 2 of the present invention.
Figure 19:
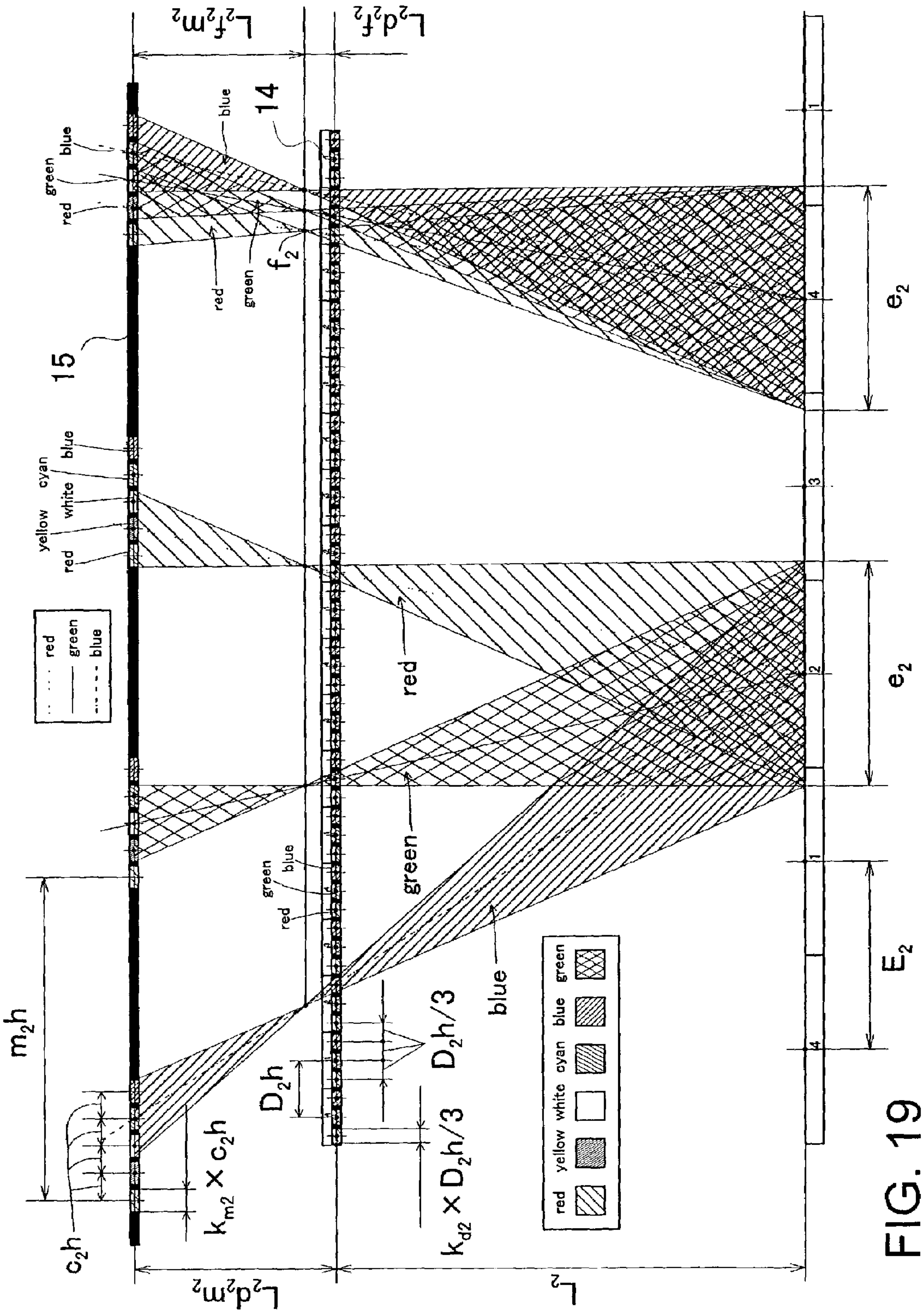

FIGS. 18 and 19 are horizontal sectional diagrams of a three-dimensional image display apparatus of the present invention, which explains a positional relationship between the transmission type display device 14, minute light source array 15, and optimal viewing position.

At this time, in order to exhibit a composite parallax image displayed on the transmission type display device 14 at the optimal viewing position in a separate manner, the respective components must satisfy geometric relationships hereinafter prescribed.

The center point of each R sub-pixel of the transmission display device 14 (the dots marked on the R sub-pixels of FIG. 18), the center point of red, yellow, and white color light sources of the minute light source array 15 which can transmit through each R sub-pixel (the center point of the yellow light source=the dot marked on the yellow light source of FIG. 18), and the center point of a parallax image corresponding to each R sub-pixel at the optimal viewing position lie in a straight line. Moreover, the same relationship is obtained in terms of G sub-pixels and B sub-pixels.

Herein, based on FIGS. 18 and 19, in terms of the transmission type display device 14, where
- the horizontal pitch of one pixel (pixel unit) is provided as $D_2h$,
- the horizontal pitch of one sub-pixel is provided as $D_2h/3$, in terms of the minute light source array 15, where
- the horizontal pitch of each color light source part is provided as $c_2h$,
- the width of a light source parts is provided as $(Km_2+4)c_2h$,
- the horizontal width of light sources which emit light to transmit through an R sub-pixel is provided as $(Km_2+2)c_2h$,
- the horizontal width of light sources which emit light to transmit through a G sub-pixel is provided as $(Km_2+2)c_2h$,
- the horizontal width of light sources which emit light to transmit through a B sub-pixel is provided as $(Km_2+2)c_2h$,
- with a shading part and a light source part of five sorts of color light source as a unit, the repeating pitch of the units is provided as $m_2h$, the distance between the transmission type display device 14 and minute light source array 15 is provided as $L_2d_2m_2$, the distance from the transmission type display device 14 to the optimal viewing position is provided as $L_2$, the horizontal pitch at which respective parallax images are formed at the optimal viewing position is provided as $E_2$, the intersection of straight lines between both end portions in the horizontal direction of an R sub-pixel of the transmission type display device 14 and both end portions of the minute light source array 15 (red, yellow, and white light sources) which can transmit through the R sub-pixels is provided as $f_2$, and where
- the distance between $f_2$ and the transmission type display device 14 is provided as $L_2d_2f_2$,
- the distance between $f_2$ and the minute light source array 15 is provided as $L_2f_2m_2$,
- the aperture ratio in the horizontal direction of pixels of the transmission type display device 14 is provided as $kd_2$,
- the aperture ratio in the horizontal direction of color filters of the minute light source array 15 is provided as $km_2$,
- the horizontal width of a parallax image at the optimal viewing position is provided as $e_2$.

the following expressions are obtained:

$$E_2:D_2h=L_2+L_2d_2m_2:L_2d_2m_2 \qquad 11$$

$$m_2h:4\times D_2h=L_2+L_2d_2m_2:L_2 \qquad 12$$

$$c_2h:D_2h/3=L_2+L_2d_2m_2:L_2 \qquad 13$$

$$m_2h:4\times E_2=L_2d_2m_2:L_2 \qquad 14$$

$$L_2d_2f_2+L_2f_2m_2=L_2d_2m_2 \qquad 15$$

$$e_2:(km_2+2)\times c_2h=L_2+L_2d_2f_2:L_2f_2m_2 \qquad 16$$

$$kd_2\times D_2h/3:(km_2+2)\times c_2h=L_2d_2f_2:L_2f_2m_2 \qquad 16'$$

However, the expressions 16 and 16' have a dependent relationship and it is sufficient that either thereof is obtained.

The aforementioned relational expressions explain a case where the number of parallax images is 4, and in a case where the number of parallax images is N (N is an integer not less than 2), it is possible to derive, by the same techniques, relational expressions by use of relational expressions:

$$m_2h:N\times D_2h=L_2+L_2d_2m_2:L_2 \qquad 12'$$

$$m_2h:N\times E_2=L_2d_2m_2:L_2 \qquad 14'$$

in place of expression 12 and 14.

NUMERICAL EXAMPLE 3

Figure 20:
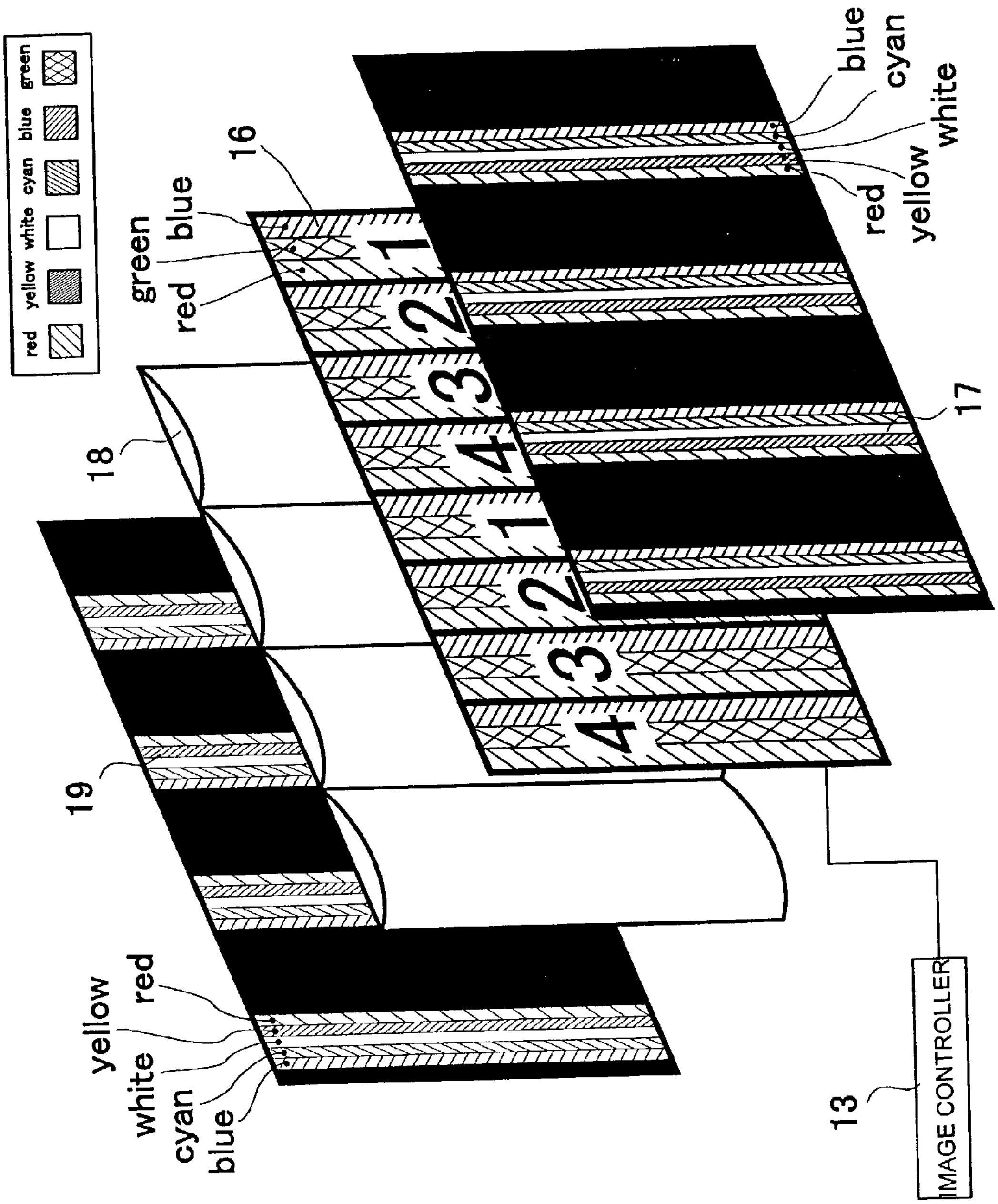
FIG. 20 is a detailed explanatory diagram of the three-dimensional image display apparatus of a numerical example 3 of the present invention.

FIG. 20 is a detailed explanatory diagram of a three-dimensional image display apparatus of the embodiment shown in FIG. 3.

As mentioned above, a vertical cylindrical lens array 18 is provided to improve utilization efficiency of light of a minute light source array 19. In addition, by a shading mask 17 with a minute aperture array, scattered light which occurs in a transmission type display device 16 is cut, therefore, crosstalk is low.

The transmission type display device 16 is composed of vertically-striped RGB sub-pixels. An image controller 13 is connected to the transmission type display device 16 and display of a composite parallax image is controlled by the image controller 13. The composite parallax image is identical to that described in terms of FIG. 12*c*.

On the display surface side of the transmission type display device 16, the shading mask 17 with a minute aperture array is provided, and on the rear surface (the side opposite to the display surface), the vertical cylindrical lens array 18 is provided. The vertical cylindrical lens array 18 consists of a plurality of cylindrical lenses, which are arranged in the horizontal direction as illustrated, having a generating line in the vertical direction. Furthermore, on the non-display surface side of the vertical cylindrical lens array 18, a minute light source array 19 is provided. The arrangement of the color light sources of the minute light source array 19 and the arrangement of the color filters of the shading mask 17 with a minute aperture array 17 are reverse in order.

In the three-dimensional image display apparatus composed of such members, in order to exhibit a composite parallax image displayed on the transmission type display device 16 at the optimal viewing position in a separate manner, the respective components must satisfy geometric relationships hereinafter prescribed.

Figure 21:
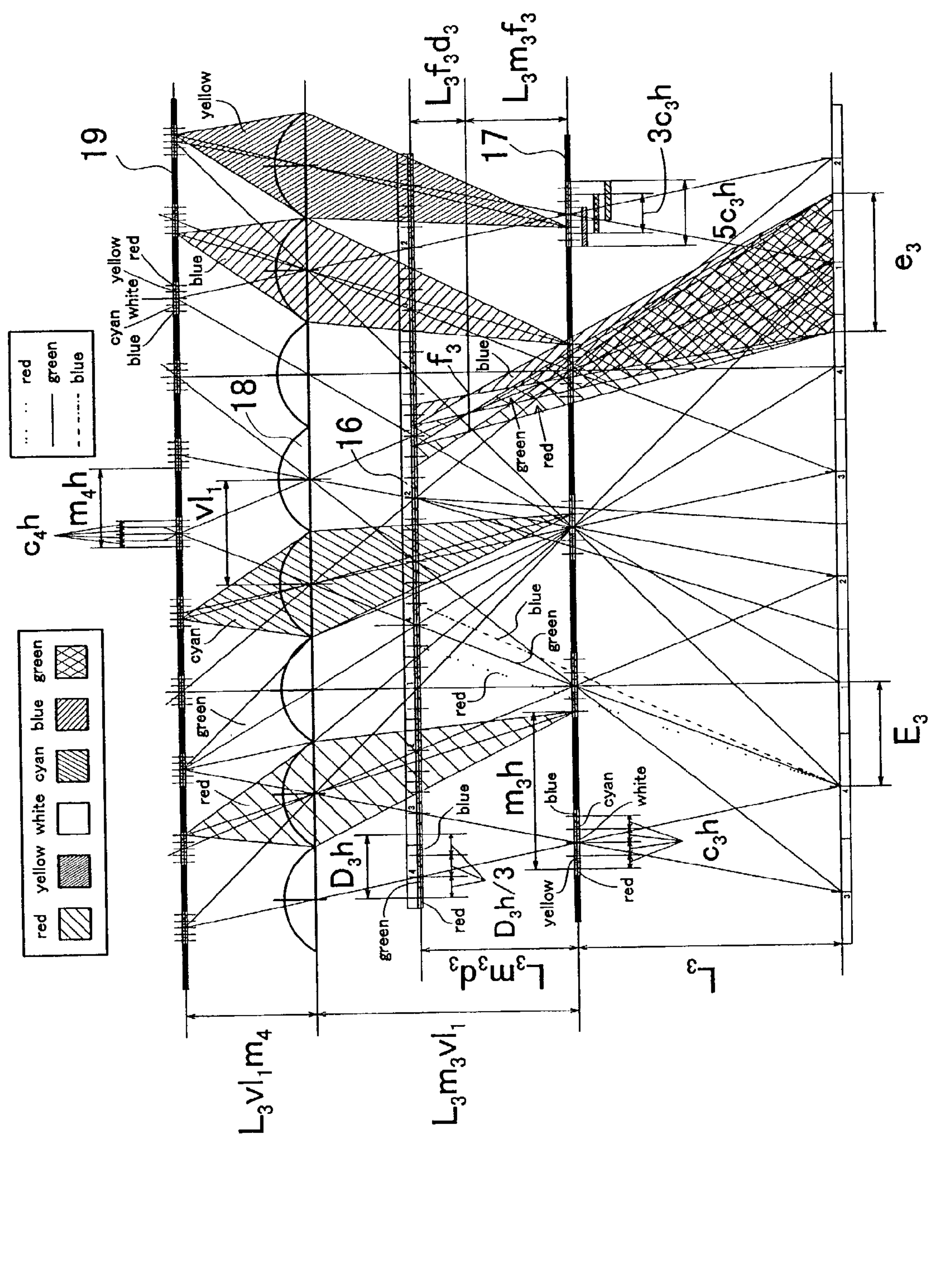
FIG. 21 is a horizontal sectional diagram, which explains actions of a vertical cylindrical lens array.

FIG. 21 is a horizontal sectional diagram, which explains actions of the vertical cylindrical lens array 18.

Except for the minute light source array 19 and vertical cylindrical lens array 18, the description becomes the same as that of FIG. 13. In addition to the conditions of the geometric relationships for arranging the respective components described in the aforementioned numerical example 1, the following conditions must be satisfied:

the center of a white light source of the minute light source array 19, the center of each cylindrical lens of the vertical cylindrical lens array 18, the center point of each G sub-pixel of the transmission type display device 16 (the dots marked on the G sub-pixels of FIG. 21), the center point of color filters through which a light from each G sub-pixel of the shading mask 17 with a minute aperture array can transmit (the dot marked on the white filter of FIG. 21), and the center point of a parallax image corresponding to each pixel at the optimal viewing position lie in a straight line.

Herein, based on FIG. 21, in terms of the transmission type display device 16, where
- the horizontal pitch of one pixel is provided as $D_3h$,
- the horizontal pitch of one sub-pixel (pixel unit) is provided as $D_3h/3$, in terms of the shading mask 17 with a minute aperture array, where
- the horizontal pitch of each color filter part is provided as $c_3h$,
- the width of all color filter parts in a filter unit is provided as $5c_3h$,
- the horizontal width of a region through which a light from an R sub-pixel can transmit is provided as $3c_3h$,
- the horizontal width of a region through which a light from a G sub-pixel can transmit is provided as $3c_3h$,
- the horizontal width of a region through which a light from a B sub-pixel can transmit is provided as $3c_3h$,
- with a shading part and an aperture part of five types of color filters as a mask unit, the repeating pitch of these mask units in the horizontal direction is provided as $m_3h$, the distance between the shading mask 17 with a minute aperture array and transmission type display device 16 is provided as $L_3m_3d_3$, the distance from the shading mask 17 with a minute aperture array to the optimal viewing position is provided as $L_3$, the horizontal pitch at which respective parallax images are formed at the optimal viewing position is provided as $E_3$, the intersection of straight lines between both end portions in the horizontal direction of an R sub-pixel of the transmission type display device 16 and both end portions of the shading mask 17 with a minute aperture array (red, yellow, and white filters) through which a light from an R sub-pixel can transmit is provided as $f_3$, and where
- the distance between the shading mask 17 with a minute aperture array and $f_3$ is provided as $L_3m_3f_3$,
- the distance between $f_3$ and the transmission type display device 16 is provided as $L_3f_3d_3$, in terms of the minute light source array 19, where
- the horizontal pitch of each color filter part is provided as $c_4h$,
- the width of all color filter parts is provided as $5c_4h$,
- the horizontal width of light sources which emit light to transmit through an R sub-pixel is provided as $3c_4h$,
- the horizontal width of light sources which emit light to transmit through a G sub-pixel is provided as $3c_4h$,
- the horizontal width of light sources which emit light to transmit through a B sub-pixel is provided as $3c_4h$, with a shading part and a light source part of five types of color light sources as a unit, the repeating pitch of these units in the horizontal direction is provided as $m_4h$, the pitch at which the respective cylindrical lenses of the vertical cylindrical lens array 18 are arranged in the horizontal direction is provided as $vl_1$, the distance between the shading mask 17 with a minute aperture array and vertical cylindrical lens array 18 is provided as $L_3m_3vl_1$, the distance between the vertical cylindrical lens array 18 and minute light source array 19 is provided as $L_3vl_1m_4$, the focal length of the vertical cylindrical lens array 18 is provided as $g_1$, and, the horizontal width of the parallax image at the optimal viewing position is provided as $e_3$ the following expressions are obtained:

$$D_3h:E_3=L_3m_3d_3:L_3 \quad 17$$

$$D_3h/3:c_3h=L_3m_3d_3+L_3:L_3 \quad 18$$

$$E_3:3c_3h=L_3m_3d_3+L_3:L_3m_3d_3 \quad 19$$

$$4\times E_3:m_3h=L_3m_3d_3+L_3:L_3m_3d_3 \quad 20$$

$$e_3:3c_3h=L_3+L_3m_3f_3:L_3m_3f_3 \quad 21$$

$$L_3m_3d_3=L_3f_3d_3+L_3m_3f_3 \quad 22$$

$$D_3h/3:3c_3h=L_3f_3d_3:L_3m_3f_3 \quad 23$$

$$D_3h/3:e_3=L_3f_3d_3:L_3+L_3m_3f_3 \quad 23'$$

$$1/g_1=1/L_3vl_1m_4+1/L_3m_3vl_1 \quad 24$$

$$2\times m_3h:vl1_1=L_3vl1_1m_4+L_3m_3vl1_1:L_3vl_1m_4 \quad 25$$

$$2\times m_4h:vl_1=L_3vl_1m_4+L_3m_3vl_1:L_3m_3vl_1 \quad 26$$

$$m_3h:m_4h=L_3m_3vl_1:L_3vl_1m_4 \quad 27$$

However, the expressions 23 and 23' have a dependent relationship and it is sufficient that either thereof is obtained.

The aforementioned relational expressions explain a case where the number of parallax images is 4, and in a case where the number of parallax images is N (N is an integer not less than 2), it is possible to derive, by the same techniques, relational expressions by use of a relational expression:

$$N\times E_3:m_3h=L_3m_3d_3+L_3:L_3m_3d_3 \quad 20'$$

in place of expression 20.

The above is an example in the case where the aperture ratio in the horizontal direction of pixels of the transmission type display device 16, the aperture ratio in the horizontal direction of the portion of five types of color filters of the shading mask 17 with a minute aperture array, and the aperture ratio in the horizontal direction of each color light source part of the minute light source array 19 are provided as 100%.

In a case where the aperture ratio is less than 100%, as well, it is possible to derive relational expressions in the same manner as in the first example.

NUMERICAL EXAMPLE 4

Figure 22:
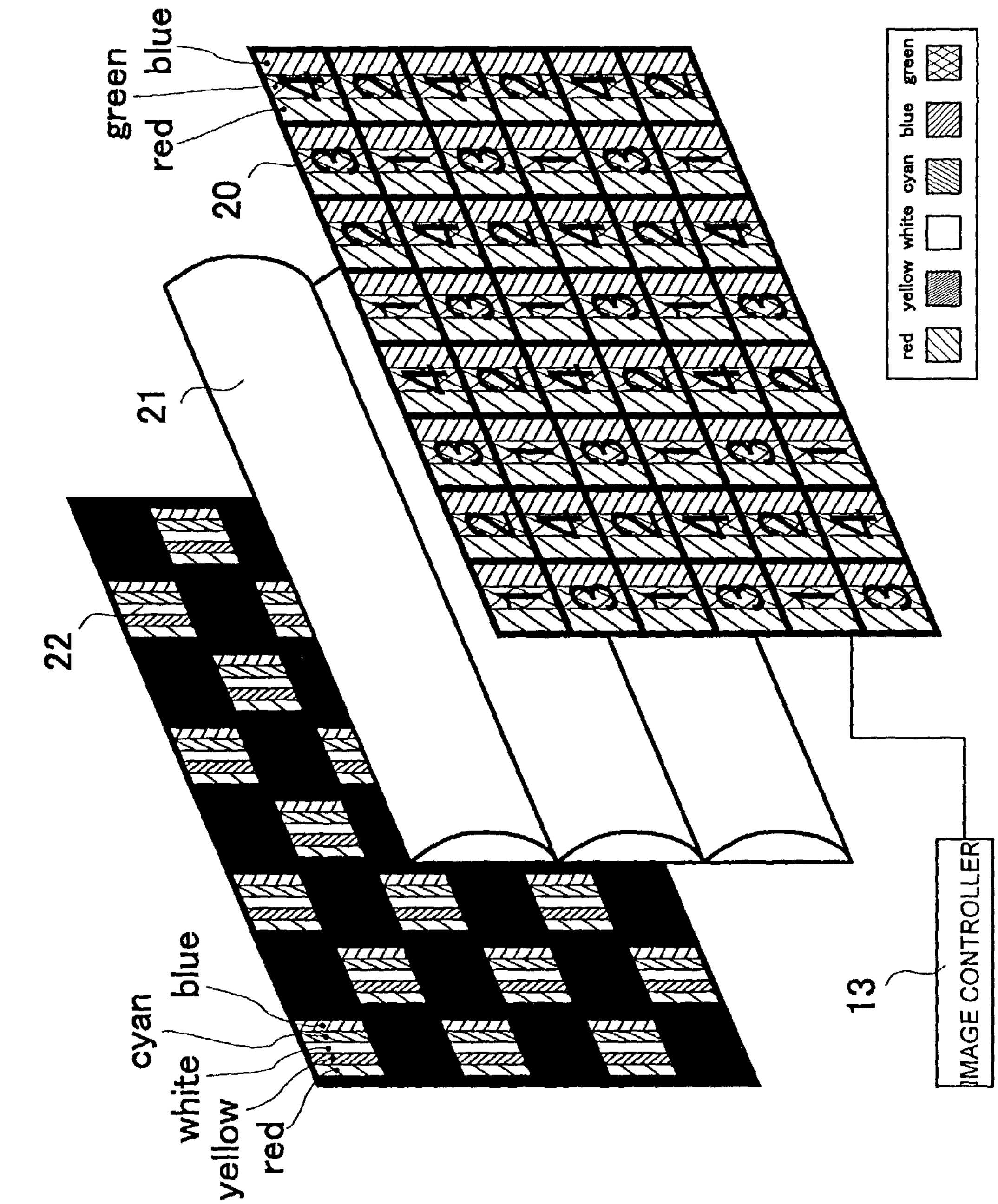
FIG. 22 is an explanatory diagram of a three-dimensional image display apparatus of a numerical example 4 of the present invention, FIG. 23 explains actions of a horizontal lenticular system used in the numerical example 4, FIG. 24 explains actions in the horizontal direction of the numerical example 4.

FIG. 22 is an explanatory diagram of a three-dimensional image display apparatus wherein the present invention has been applied to International Publication WO 01/37579 A1.

A transmission type display device 20 is composed of vertically-striped RGB sub-pixels. An image controller 13 is connected to the transmission type display device 20 and display of a composite parallax image is controlled by the image controller 13. As a composite parallax image, pixels of approximately identical parts of four parallax images are, as illustrated, constructed so that in a matrix-like pattern of 2 rows and 2 columns, pixels extracted from parallax images 1–4 do not overlap with pixels extracted from the same-numbered pixel images. The composite parallax image used in the example is an image composed by, while regarding this matrix-like pattern as a unit composite parallax image pattern, further sequentially arranging such unit composite parallax image patterns in a matrix shape. In the composite parallax image of the aforementioned embodiments of FIG. 1 through FIG. 3, resolution in only the horizontal direction declined, whereas in the present example, a decline in resolution is dispersed in the vertical and horizontal directions, whereby, a high displaying efficiency can be obtained and the decline in resolution is made insignificant.

On the rear surface (the side opposite to the display surface) of the transmission type display device 20, a horizontal cylindrical lens array 21 is provided. The horizontal cylindrical lens array 21 consists of a plurality of cylindrical lenses, which are arranged in the vertical direction as illustrated, having a generating line in the horizontal direction. Furthermore, on the non-display surface side of the horizontal cylindrical lens array 21, a minute light source array 22 is provided. The minute light source array 22 consists of, as illustrated, a hound's tooth check-like arrangement of color light source portions.

Figure 23:
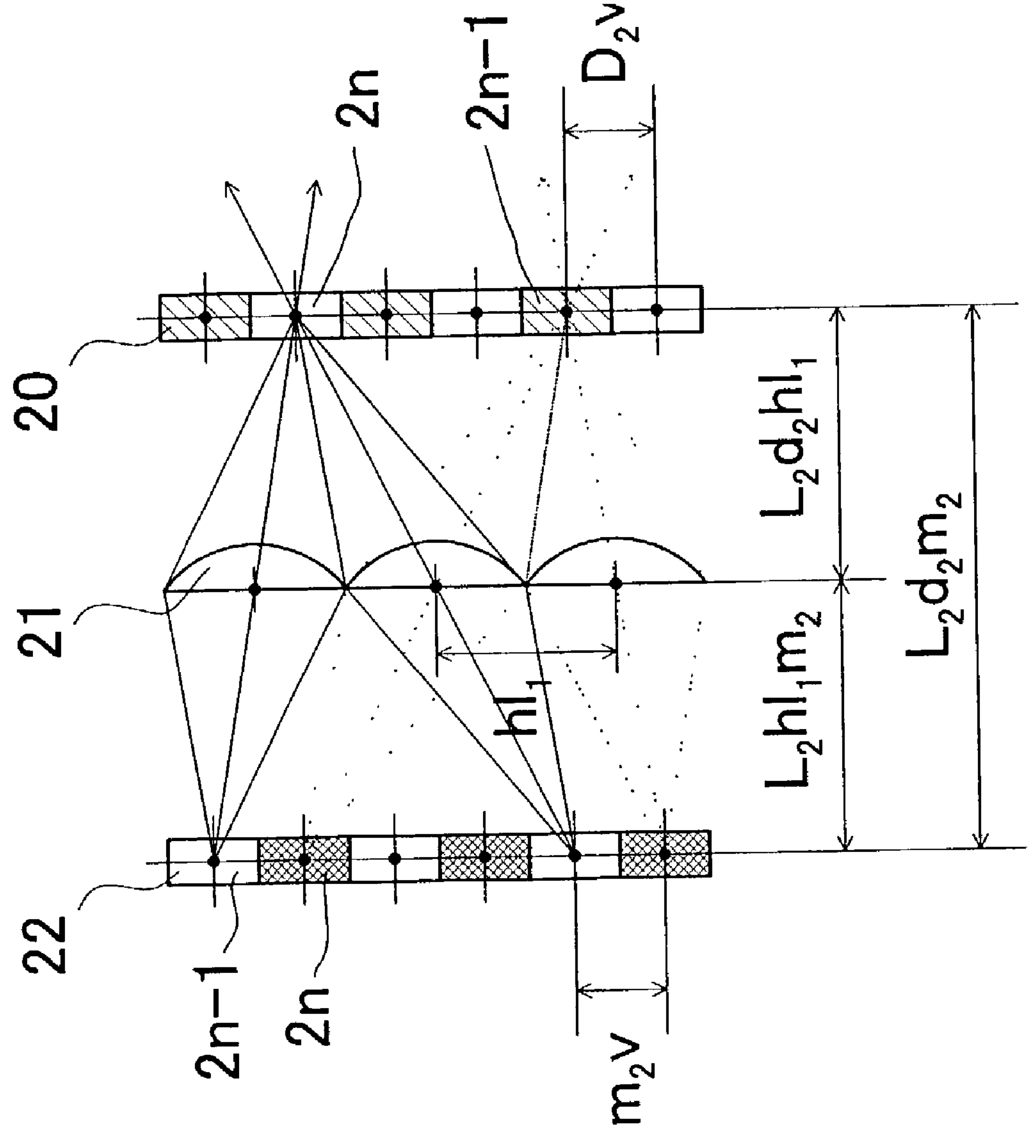

FIG. 23 explains actions of a horizontal lenticular system. A light from an odd-numbered column (2n−1: n is an integer not less than 1) from the top of the minute light source array 22 in the horizontal direction becomes, due to actions of the horizontal cylindrical lens array 21, a light toward pixels of an even-numbered column (2n: n is an integer not less than 1) from the top of the transmission type display device 20 in the horizontal direction and becomes, after transmitting through the transmission type display device 20, a light expanding in the up-and-down direction. A light from an even-numbered column from the top of the minute light source array 22 in the horizontal direction becomes a light toward pixels of an odd-numbered column from the top of the transmission type display device 20 in the horizontal direction and becomes, after transmitting through the transmission type display device 20, a light expanding in the up-and-down direction.

Herein, where

- the vertical pitch of one pixel (pixel unit) of the transmission type display device 20 is provided as $D_2v$,
- the pitch at which respective cylindrical lenses of the horizontal cylindrical lens array 21 are arranged in the vertical direction is provided as $h1_1$,
- the distance between the transmission type display device 20 and horizontal cylindrical lens array 21 is provided as $L_2d_2h1_1$,
- the distance between the horizontal cylindrical lens array 21 and minute light source array 22 is provided as $L_2h1m_2$,
- the vertical pitch of the hound's tooth check of the minute light source array 22 is provided as $m_2v$,
- the focal length of cylindrical lenses of the horizontal cylindrical lens array 21 is provided as $g_2$, in a prior three-dimensional image display apparatus, the following expressions are obtained:

$$1/g_2=1/L_2hl_1m_2+1/L_2d_2hl_1 \quad 28$$

$$L_2d_2m_2=L_2d_2hl_1+L_2hl_1m_2 \quad 29$$

$$4\times m_2V:hl_1=L_2d_2m_2:L_2d_2hl_1 \quad 30$$

$$4\times D_2V:hl_1=L_2d_2m_2:L_2hl_1m_2 \quad 31$$

Since the number of parallax images is provided as 4 and a pattern of 2 rows and 2 columns was used as a unit composite parallax image pattern in the present example, the aforementioned relational expressions express a case where one cylindrical lens of the horizontal cylindrical lens array 21 corresponds to two pixels of the transmission type display device 20.

As a matter of course, it is also possible to derive, by the same techniques, relational expressions in a case where the number of parallax images is provided as N (N is an integer not less than 2), a pattern of P-rows and Q-columns (P×Q=N) is used as a unit composite parallax image pattern, and one cylindrical lens in the horizontal cylindrical lens array corresponds to P pixels (P is an integer not less than 2) of the transmission type display device.

In this case, in place of expressions 29 and 30, the following expressions are used:

$$2\times p\times m_2v:hl_1=L_2d_2m_2:L_2d_2hl_1 \quad 30'$$

$$2\times P\times D_2v:hl_1=L_2d_2m_2:L_2hl_1m_2 \quad 31'$$

Herein, when paying attention to one horizontal line, the positional relationship is the same as that described in terms of FIG. 18.

Figure 24:
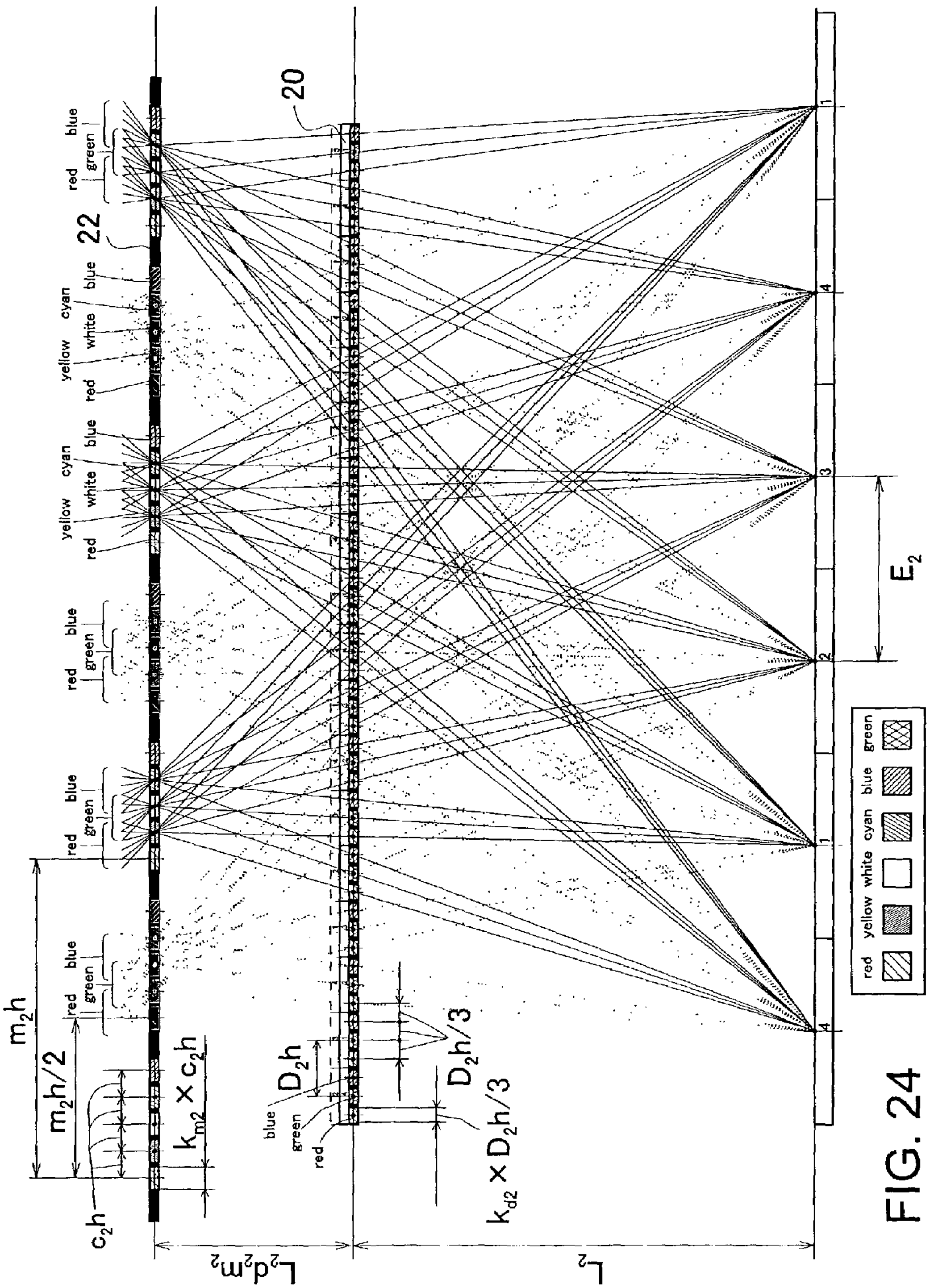

FIG. 24 explains actions in the horizontal direction. As the minute light source array 22 part, an odd-numbered column from the top in the horizontal direction is illustrated, an even-numbered column from the top of the transmission type display device 20 in the horizontal direction is illustrated. In addition, in the drawing, the hatching region with white lines against a black background of the minute light source array 22 and light rays shown by dotted lines show conditions of even-numbered columns of the light source array 22 and odd-numbered columns of the transmission type display device 20, which do not exist in this drawing. The horizontal cylindrical lens array 21 is omitted. In addition, when paying attention to one horizontal line, the positional relationship is the same as that described in terms of FIG. 18, therefore, as symbols to describe the shapes of respective component members, the same symbols as those in the description of FIG. 18 are used.

In such a construction, in order to exhibit a composite parallax image displayed on the transmission type display device 20 at the optimal viewing position in a separate manner, it is sufficient that the respective components satisfy the same geometric relationships as those described in terms of FIG. 18.

NUMERICAL EXAMPLE 5

Figure 25:
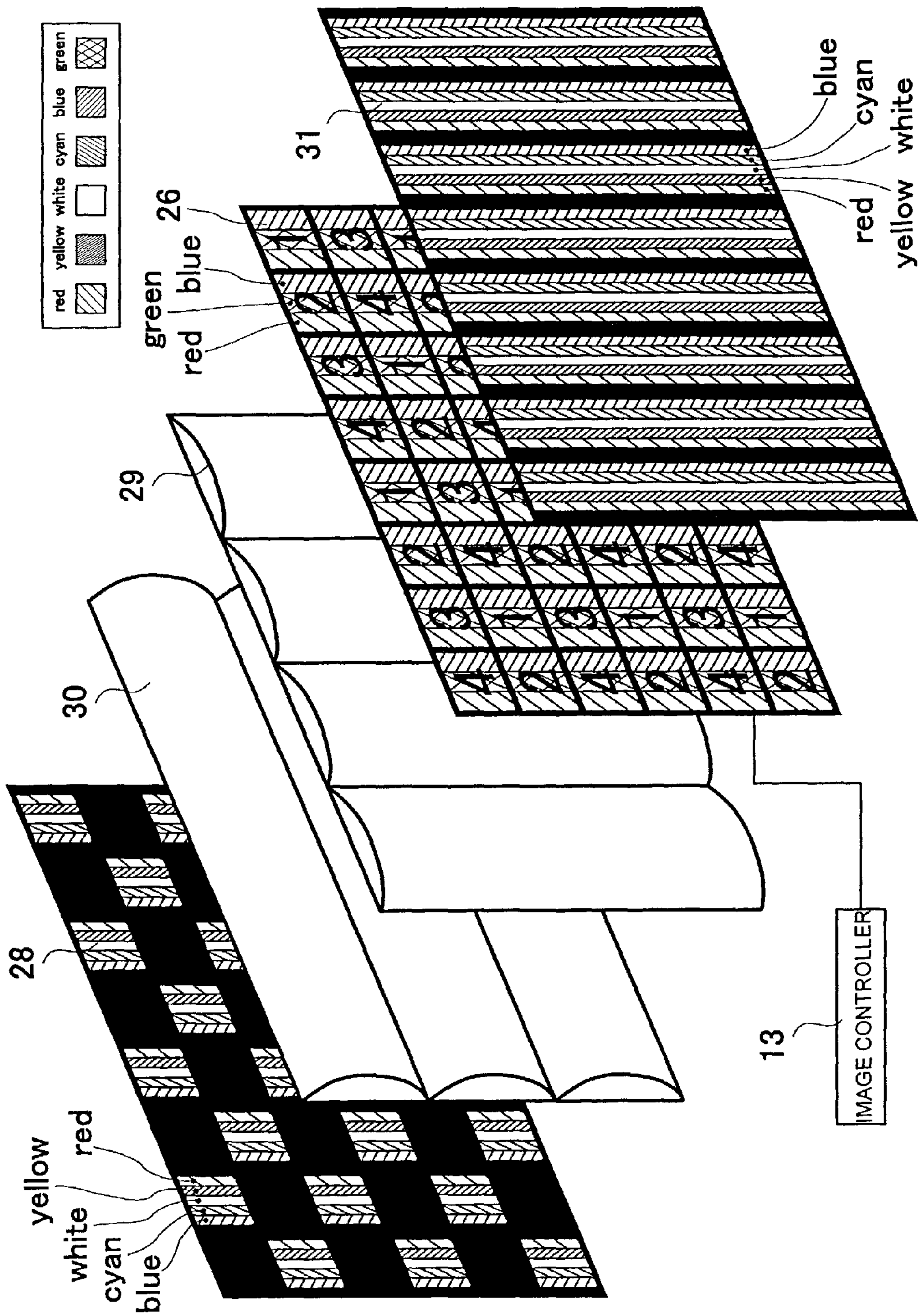
FIG. 25 is an explanatory diagram of a three-dimensioned image display apparatus of a numerical example 5 of the present invention.

FIG. 25 is an explanatory diagram of a three-dimensional image display apparatus to which have been applied a method for improving, by means of a vertical cylindrical lens, a minute light source array in utilization efficiency of light, which has been described in terms of FIG. 20, and a method for making a deterioration in resolution insignificant, which has been described in terms of FIG. 22.

In FIG. 25, in order from the viewing surface side of the three-dimensional image display apparatus, a shading mask 31 with a minute aperture array, a transmission type display device 26, a vertical cylindrical lens array 29, a horizontal cylindrical lens array 30, and a minute light source array 28 are arranged.

In the shading mask 31 with a minute aperture array, the repeating pitch $m_3h$ in the horizontal direction of the mask unit of the shading mask 17 with a minute aperture array that consists of a shading part and an aperture part of five types of color filters, which has been described in terms of FIG. 21, has been changed to $m_3h/2$.

An image controller 13 is connected to the transmission type display device 26 and display of a composite parallax image is controlled by the image controller 13. The composite parallax image is prepared by the same techniques as those described in terms of FIG. 22, however, the order in which pixels are arranged is different. In the present example, as well, a decline in resolution is dispersed in the vertical and horizontal directions, whereby, a high displaying efficiency can be obtained and the decline in resolution is insignificant.

The vertical cylindrical lens array 29 is equivalent to that described in terms of FIG. 20.

The horizontal cylindrical lens array 30 and minute light source array 28 are equivalent to those described in terms of FIG. 22.

Figure 26:
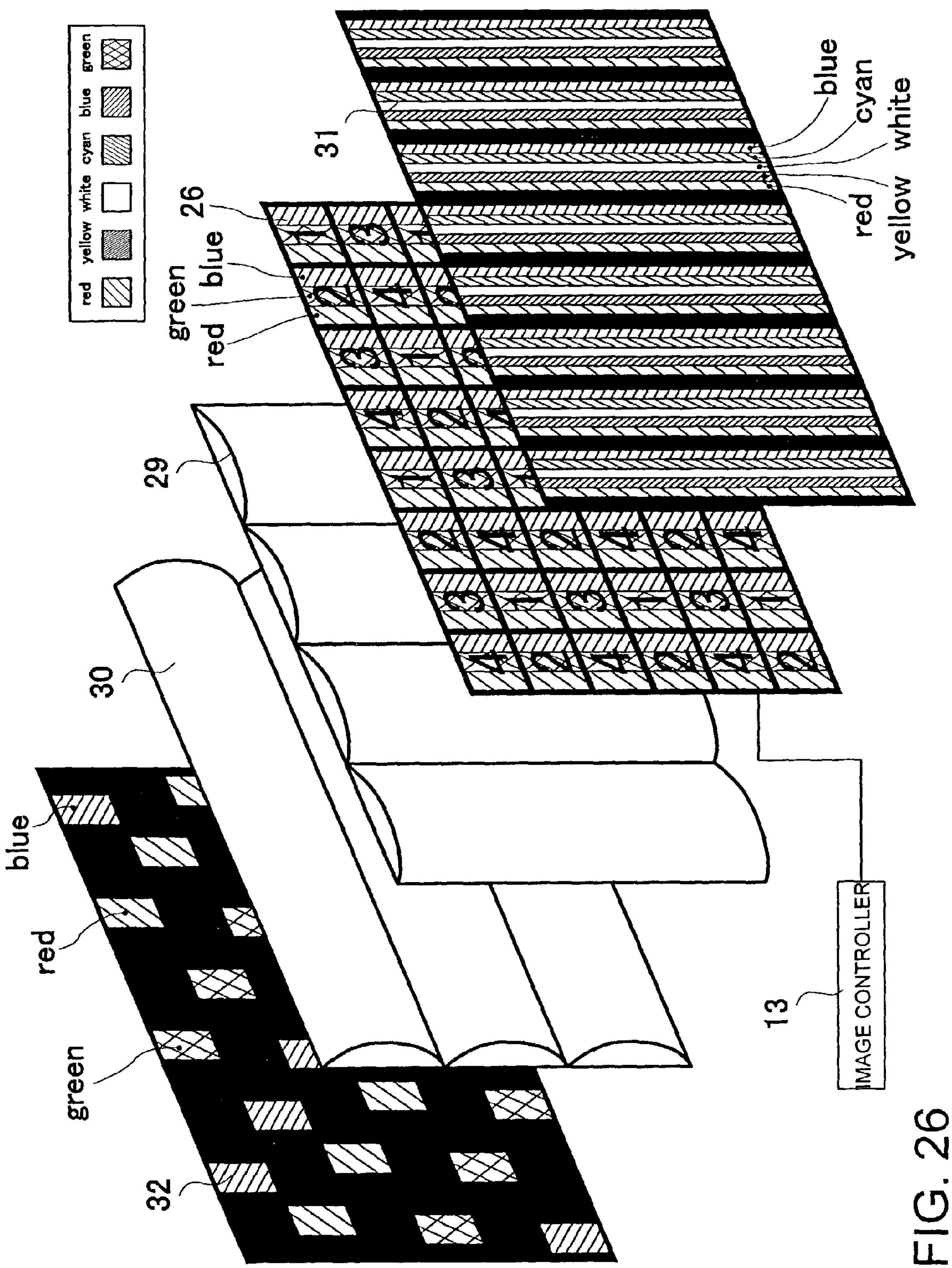
FIG. 26 is an explanatory diagram of a three-dimensioned image display apparatus of a modified numerical example 5 of the present invention, FIG. 27 explains actions in the horizontal direction of the numerical example 5 shown in FIG. 26.

In addition, as shown in FIG. 26, it is also possible to use, in place of the minute light source array 28 described in terms of FIG. 25, a minute light source array 32 which consists of RGB light sources.

For the minute light source array 32, if an R light source is arranged on the red, yellow, and white part of the respective color light sources of the minute light source array 28, the remaining cyan and blue parts are provided as a shading part, and if a G light source is arranged on the yellow, white, and cyan part, the remaining red and blue parts are provided as a shading part, and if a B light source is arranged on the white, cyan, and blue part, the remaining red and yellow parts are provided as a shading part. Furthermore, as a pattern of light sources to be arranged on one horizontal line of the minute light source array 32, light sources are repeatingly arranged in order of B, G, R, B, G, R . . . from the left of the illustration.

Figure 27:
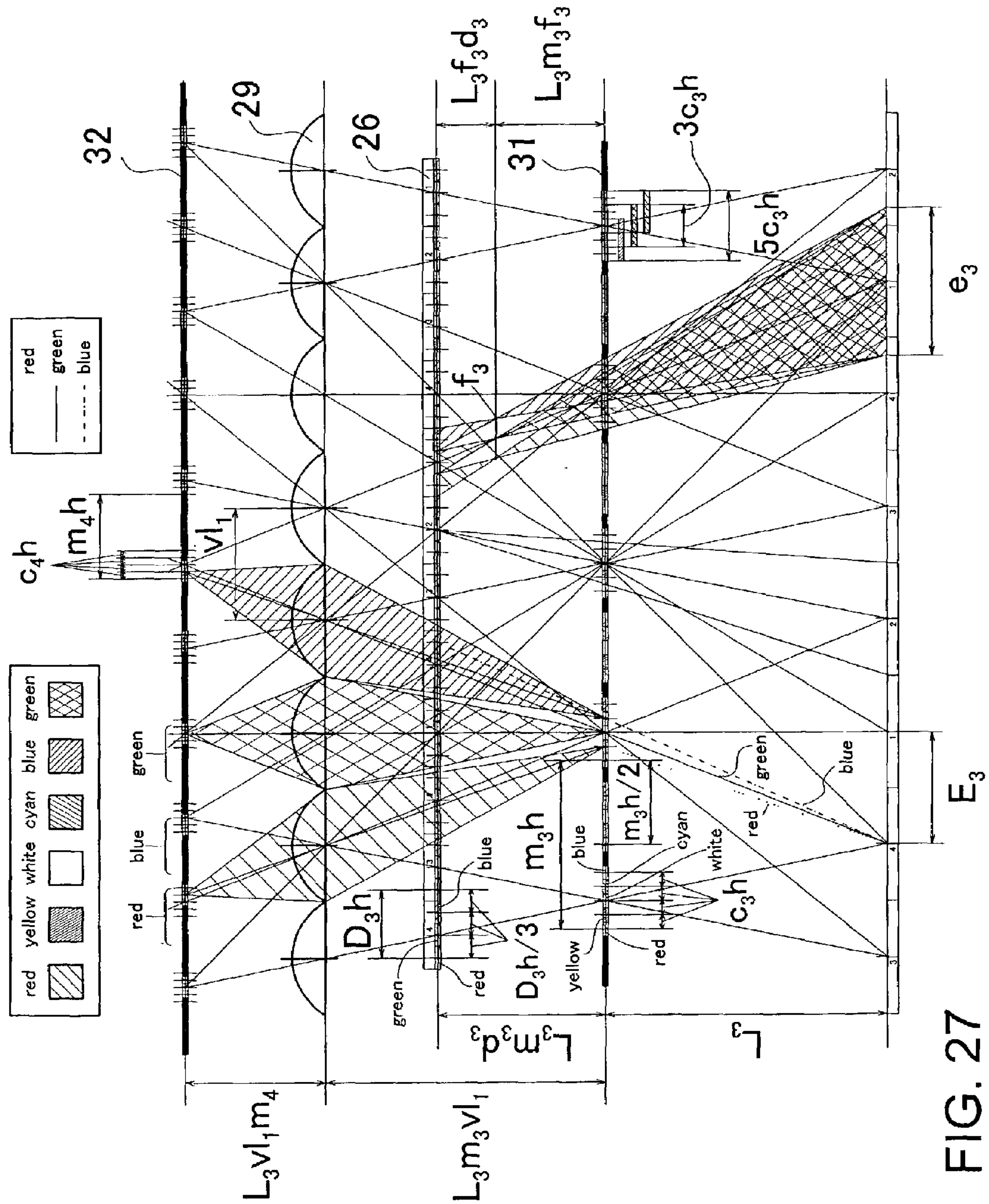

FIG. 27 explains actions of the three-dimensional image display apparatus of FIG. 26 in the horizontal direction.

As the minute light source array 32 part, an odd-numbered column from the top in the horizontal direction is illustrated, and an even-numbered column from the top of the transmission type display device 26 in the horizontal direction is illustrated. In addition, in the drawing, the hatching region with white lines against a black background of the minute light source array 32 shows positions of light sources in even-numbered columns, which do not exist in this drawing. The horizontal cylindrical lens array 30 is omitted.

At this time, the arrangement of the shading mask 31 with a minute aperture array, the transmission type display device 26, the vertical cylindrical lens array 29, and the minute light source array 32 is the same as that described in terms of FIG. 21. Therefore, as symbols in the drawing, the same symbols as those in the description of FIG. 21 are used.

The arrangement of the transmission type display device 26, the horizontal cylindrical lens array 30, and the minute light source array 32 is the same as that described in terms of FIG. 24.

Figure 28:
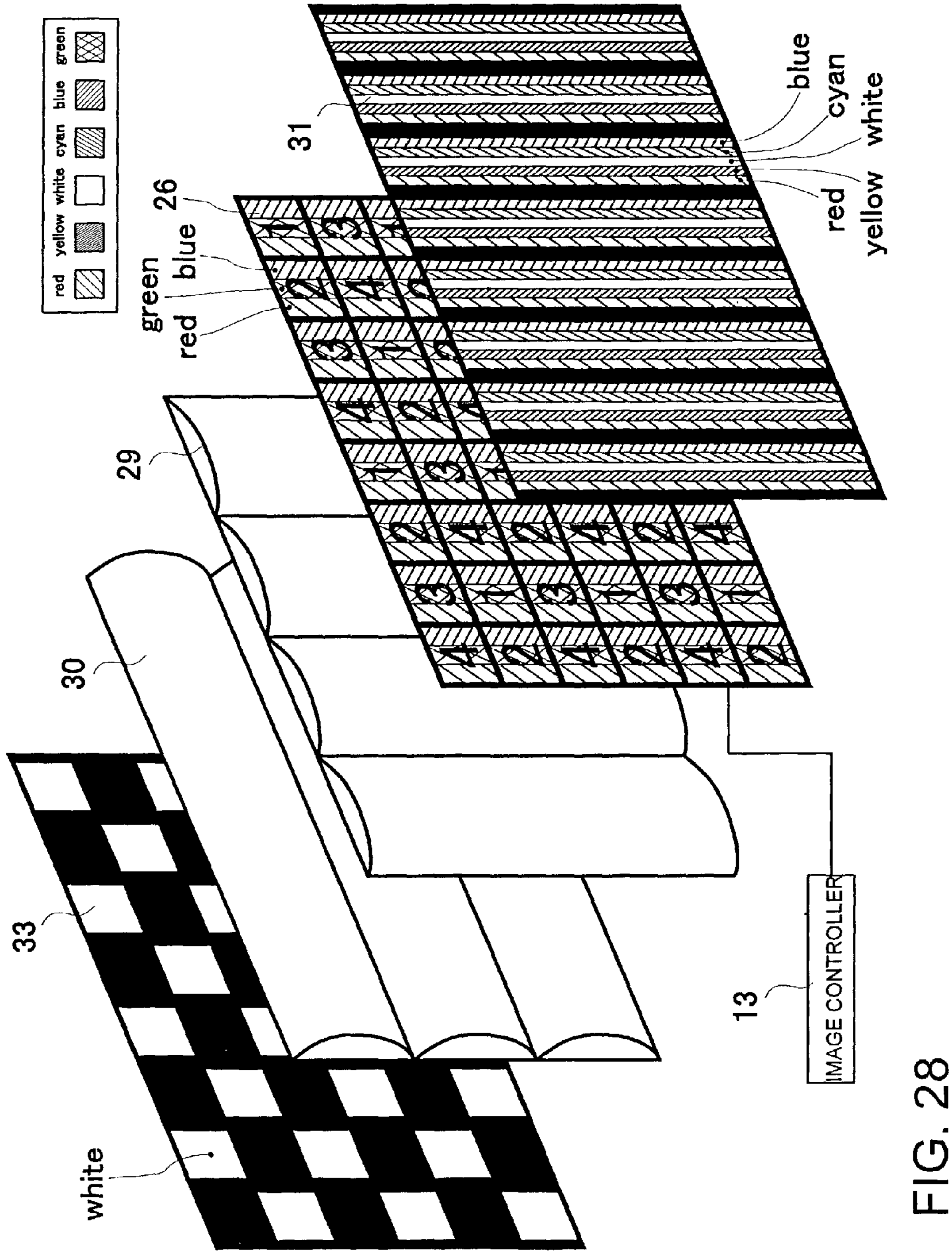
FIG. 28 is an explanatory diagram of a three-dimensional image display apparatus of a modified numerical example 5, FIG. 29 explains actions in the horizontal direction of the numerical example 5 shown in FIG. 28.

Furthermore, in FIG. 28, in place of the minute light source array 32 of the three-dimensional image display apparatus described in terms of FIG. 26, a minute light source array 33 which consists of white light sources is used. Component members with the same numbers as those of FIG. 26 perform the same functions as those of FIG. 26.

In the minute light source array 33, the red, yellow, white, cyan, and blue parts of the respective color sources of the minute light source array 28, which have been described in terms of FIG. 25, are changed to white light sources.

Figure 29:
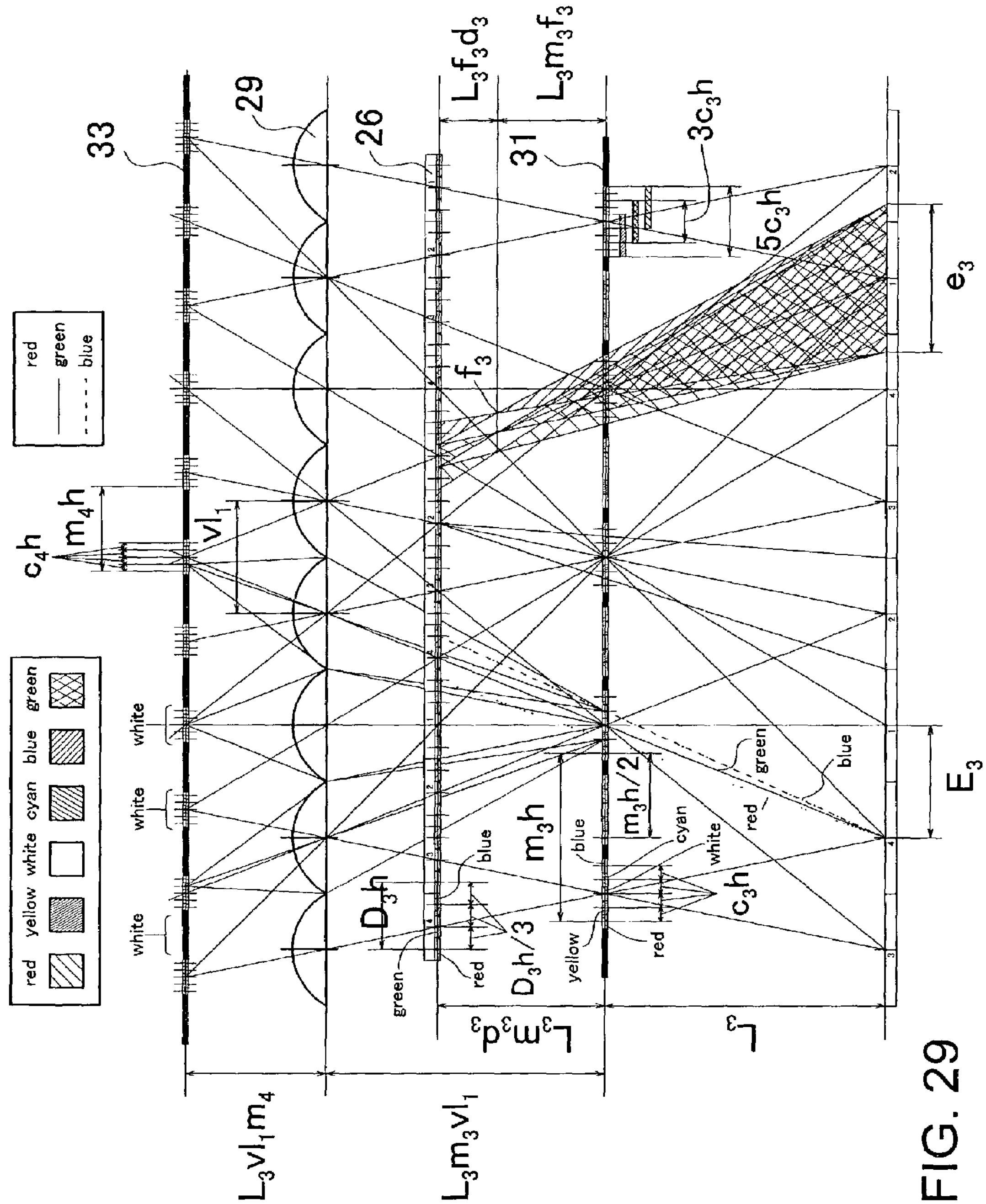

FIG. 29 explains actions in the horizontal direction of the three-dimensional image display apparatus of FIG. 28.

As the minute light source array 33 part, an odd-numbered column from the top in the horizontal direction is illustrated, and an even-numbered column from the top of the transmission type display device 26 in the horizontal direction is illustrated. In addition, in the drawing, the hatching region with white lines against a black background of the minute light source array 33 shows positions of light sources in even-numbered columns, which do not exist in this drawing. The horizontal cylindrical lens array 30 is omitted.

Similar to the case of FIG. 26, this is also the same as FIG. 21 and FIG. 24.

Namely, the three-dimensional image display apparatus of FIGS. 25, 26, and 28 can, if the positional relationships described in terms of FIGS. 21, 23, and 24 are satisfied, exhibit a composite parallax image satisfactorily displayed on the transmission type display device 26 in a separate manner at the optimal viewing position.

Figure 30:
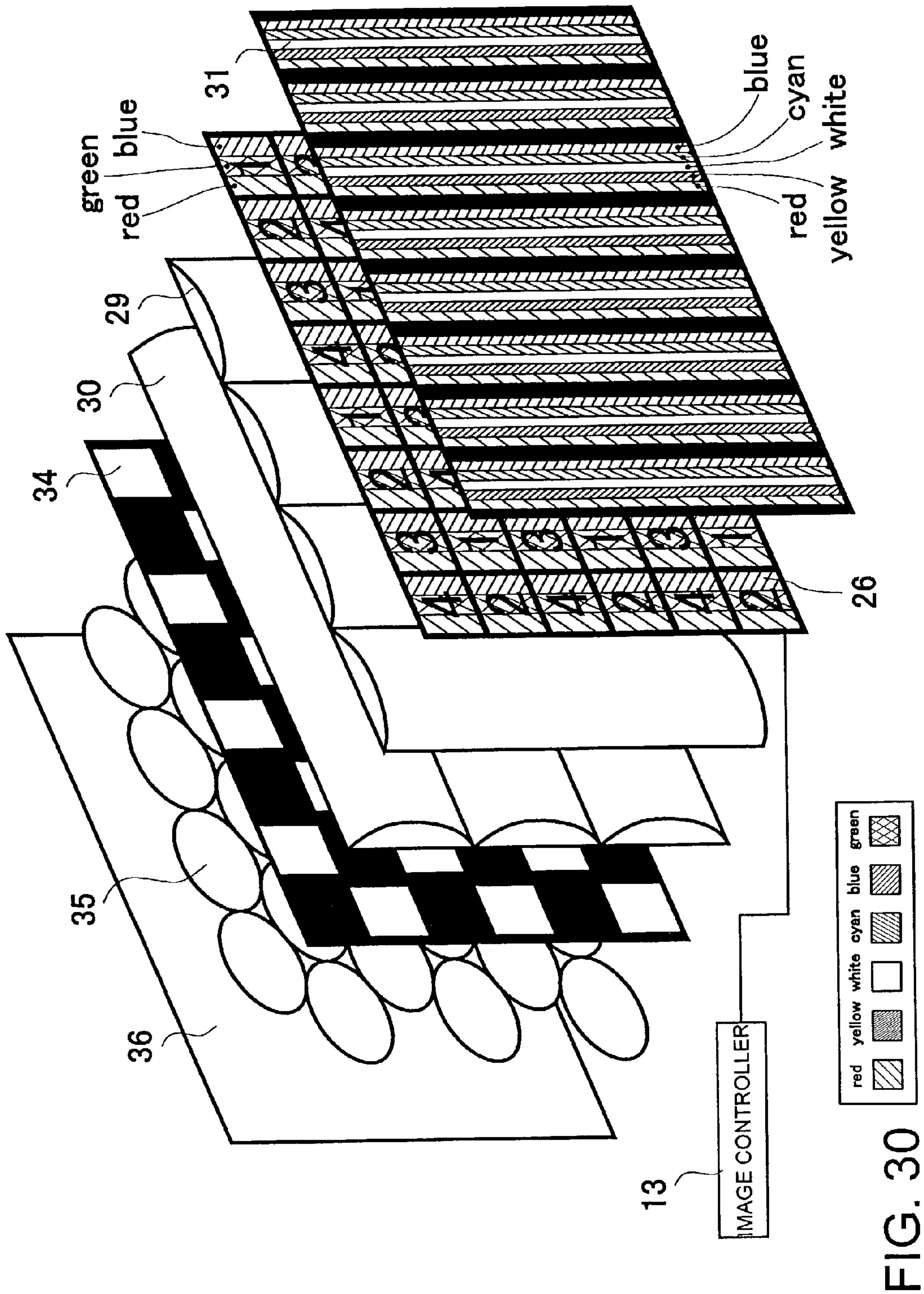
FIG. 30 is an explanatory diagram of a three-dimensional image display apparatus of a modified numerical example 5, FIG. 31 explains actions in the horizontal direction of the three-dimensional image display apparatus shown in FIG. 30.

FIG. 30 relates to a still another embodiment (fourth embodiment) of the present invention, wherein display luminance of the three-dimensional image display apparatus of FIG. 28 is improved.

In order from the viewing surface side, a shading mask 31 with a minute aperture array, a transmission type display device 26, a vertical cylindrical lens array 29, a horizontal cylindrical lens array 30, a shading mask 34 with a minute aperture array, a lens array 35, and a white light source array 36 are arranged.

In the drawing, component members with the same numbers as those of FIG. 28 perform the same functions as those of FIG. 28.

The shading mask 34 with a minute aperture array is a mask array wherein shading parts having the same shape as the shading parts of the minute light source array 33, which has been described in terms of FIG. 28, and transparent aperture parts changed from the light emitting parts of the minute light source array 33.

The light source 36 is a white light source array comprising a fluorescent backlight, a white LED array, a light source array constructed by arranging white lamps lengthwise and breadthwise, etc.

Microlenses 35 are a lens array for condensing lights from the white light source array 36 to the respective aperture parts of the shading mask 34 with a minute aperture array.

Figure 31:
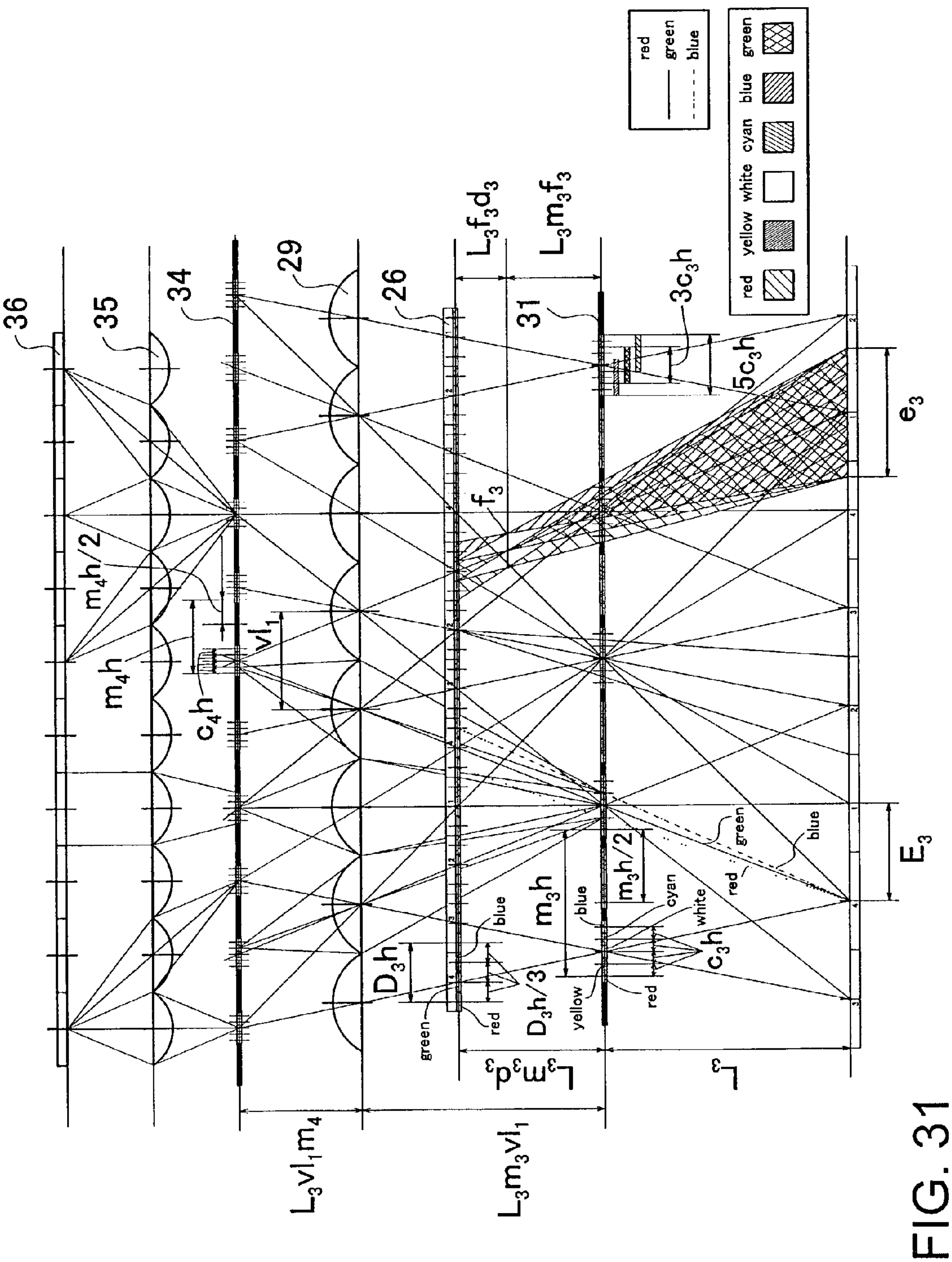

FIG. 31 explains actions in the horizontal direction of the three-dimensional image display apparatus of FIG. 30.

Also, in the present drawing, as the shading mask 34 part with a minute aperture array, an odd-numbered column from the top in the horizontal direction is illustrated, and an even-numbered column from the top of the transmission type display device 26 in the horizontal direction is illustrated. In addition, in the drawing, the hatching region with white lines against a black background of the shading mask 34 with a minute aperture array shows positions of light sources in even-numbered columns, which do not exist in this drawing. The horizontal cylindrical lens array 30 is omitted.

As illustrated, lights from the white light source array 36 are, by the lens array 35, condensed (in a contracted manner) to aperture parts of the shading mask 34 with a minute aperture array. Namely, lights from the white light source array 36 can be efficiently guided to the transmission type display device 26, therefore, display luminance of the three-dimensional image display apparatus can be improved.

Figure 32:
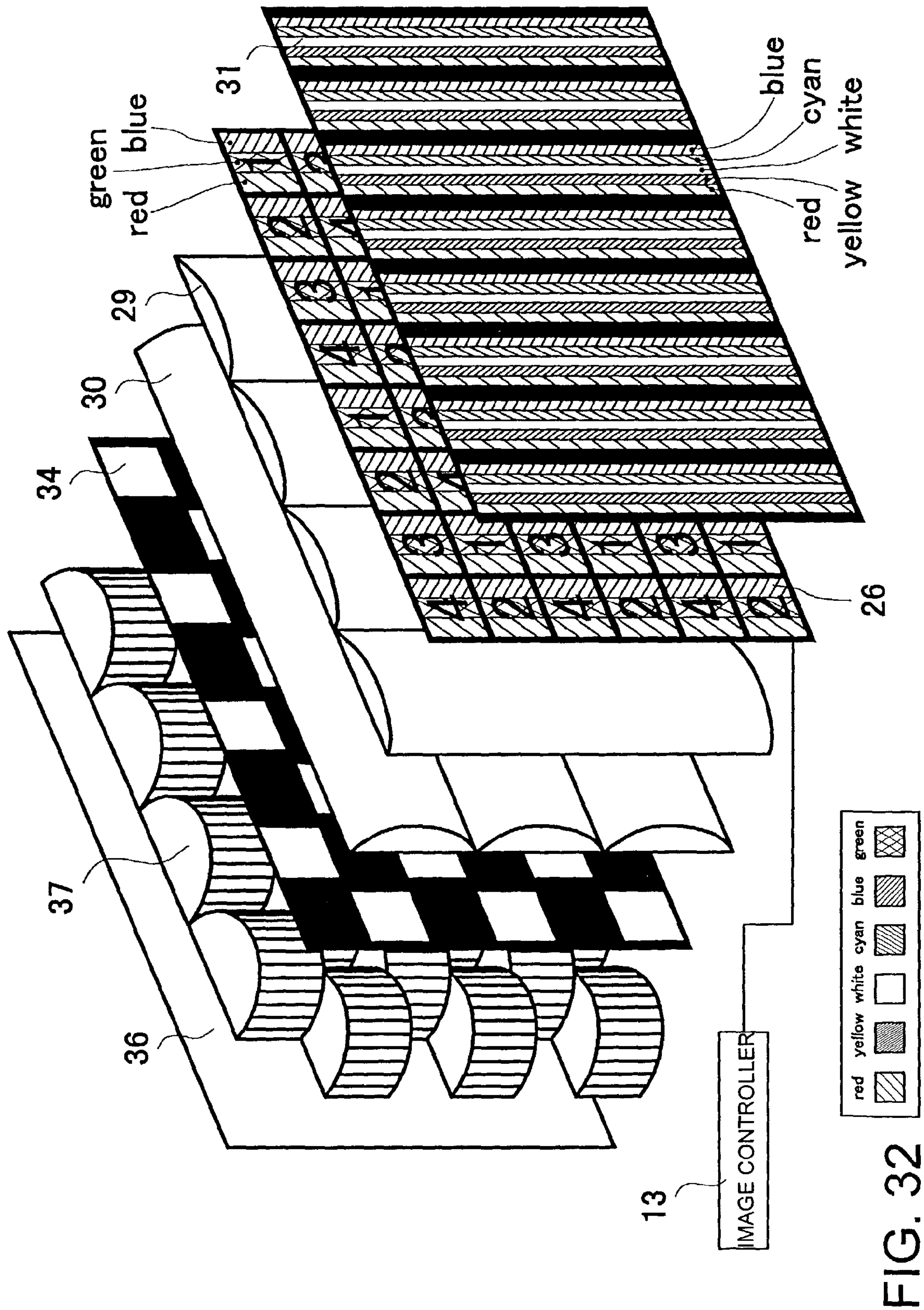
FIG. 32 is an explanatory diagram of the fourth embodiment of the three-dimensional image display apparatus of the present invention.

In addition, in a case where the shape of the aperture portions of the shading mask 34 with a minute aperture array is rectangular, as shown in FIG. 32, a cylindrical lens array 37 having a shape of hound's tooth check-like arranged cylindrical lenses can also be used in place of the lens array 35.

According to the color reproducing method for a three-dimensional image display of the respective embodiments as described above, minute apertures and minute light sources for displaying parallax images in a distributed manner in a predetermined respective viewpoint directions are colored so as to correspond to the RGB sub-pixels of the color display device, therefore, an advantage is provided such that occurrence of color eclipses where only a part of a parallax image pixel appears lighted and crosstalk are suppressed and wherein color reproduction can be carried out.

In addition, according to the three-dimensional image display apparatus of the above respective embodiments using a minute light source array, a microlens array, a transmission type color display device, and a shading mask (color filters) with a minute aperture array has an advantage such that satisfactory color reproducibility and utilization efficiency of light are secured while resolution and the number of viewpoints can be increased.

In addition, by condensing (in a contracted manner) lights from the light sources to the minute aperture parts of the shading mask by actions of a lens array, it becomes possible to efficiently utilize the lights from the light sources and an action is provided such that display luminance of the three-dimensional image display apparatus can be improved.

What is claimed is:

1. A color reproducing method for a three-dimensional image display in a three-dimensional image display apparatus provided with a shading mask with a minute aperture array, having minute aperture parts, in front of a color display device, each minute aperture part being provided with a color filter composed of a red-light transmitting part, a green-light transmitting part, and a blue-light transmitting part, said method comprising:

- a corresponding step of, between the respective red-transmitting part, the green-transmitting part, and the blue-light transmitting part of the color filters and respective red, green, and blue sub-pixels of the color display device, corresponding the light transmitting parts and the sub-pixels that have a same color and exist in a same parallax image pixel region to each other,
- a setting step of setting such that visual angles between the respective centers of the red-light transmitting part, the green-light transmitting part, and the blue-light transmitting part of the color filters become equal, in an identical parallax image pixel region, to visual angles between the respective centers of the red sub-pixel, the green sub-pixel, and the blue sub-pixel of the color display device,
- a display step of always displaying the red sub-pixel, the green sub-pixel, and the blue sub-pixel which belong to an identical parallax image pixel region at a fixed area ratio in a lighted condition, and
- a color reproducing step of, at a viewing position of the three-dimensional image display apparatus at an optimal viewing distance, performing color reproduction while maintaining the ratio of brightness of the three RGB primary colors at a predetermined value in each of the respective parallax image pixels.

2. A color reproducing method for a three-dimensional image display according to claim 1, wherein parts of the respective red-light transmitting part, the green-light transmitting part, and the blue-light transmitting part of the color filters are overlapped with each other by color mixing according to an additive color mixing method for the three primary colors of light, thereby allowing respective primary-color lights to transmit in an overlapped manner.

3. A color reproducing method for a three-dimensional image display according to claim 1, wherein in terms of the viewing position of the three-dimensional image display apparatus at an optimal viewing distance, the pixel pitch of the color display device, the width of a red-light transmitting part of the color filter, the width of a green-light transmitting part of the color filter, and the width of a blue-light transmitting part of the color filter are observed with an equal visual angle in a direction where the respective primary colors are arranged in an identical parallax image pixel region.

4. A three-dimensional image display apparatus in which a color reproducing method for a three-dimensional image display according to claim 1 is used.

5. A color reproducing method for a three-dimensional image display in a three-dimensional image display apparatus provided with a shading mask with a minute light source array, having light sources, in the rear of a transmission type color display device, each light source being composed of a red-light emitting part, a green-light emitting part, and a blue-light emitting part, said method comprising:

a corresponding step of, between the respective red-light emitting part, the green-light emitting part, and the blue-light emitting part of the minute light sources and respective red, green, and blue sub-pixels of the transmission type color display device, corresponding the light emitting parts and the sub-pixels that have a same color and exist in a same parallax image pixel region to each other, a setting step of setting such that visual angles between the respective centers of the red-light emitting part, the green-light emitting part, and the blue-light emitting part of the minute light sources become equal, in an identical parallax image pixel region, to visual angles between the respective centers of the red sub-pixel, the green sub-pixel, and the blue sub-pixel of the transmission type color display device, a display step of always displaying the red sub-pixel, the green sub-pixel, and the blue sub-pixel which belong to an identical parallax image pixel at a fixed area ratio in a lighted condition, and a color reproducing step of, at a viewing position of the three-dimensional image display apparatus at an optimal viewing distance, performing color reproduction while maintaining the ratio of brightness of the three RGB primary colors at a predetermined value in each of the respective parallax images.

6. A color reproducing method for a three-dimensional image display according to claim 5, wherein parts of the respective red-light emitting part, the green-light emitting part, and the blue-light emitting part of the minute light sources are overlapped with each other by color mixing according to an additive color mixing method for the three primary colors of light, thereby allowing respective primary-color lights to be emitted in an overlapped manner.

7. A color reproducing method for a three-dimensional image display according to claim 5, wherein in terms of the viewing position of the three-dimensional display apparatus at an optimal viewing distance, the pixel pitch of the transmission type color display device, the width of a red-light emitting part of the minute light source, the width of a green-light emitting part of the minute light source, and the width of a blue-light emitting part of the minute light source are observed with an equal visual angle in a direction where the respective primary colors are arranged in an identical parallax image pixel region.

8. A color reproducing method for a three-dimensional image display according to claim 4, wherein the three-dimensional image display apparatus comprises:

the transmission type display device; and a positive microlens array arranged between the minute light source array and the transmission type display device;

wherein the shading mask includes a minute aperture array, having minute aperture parts such that the minute aperture parts are provided at respective positions of real images of the minute light sources of the minute light source array, formed by the positive microlens array in front of the transmission display device.

9. A three-dimensional image display apparatus in which a color reproducing method for a three-dimensional image display according to claim 5 is performed.

10. A three-dimensional image apparatus comprising:

a display device which has pixel units, each composed of sub-pixels of a plurality of colors arranged in a horizontal direction and each being a unit of display, and which displays two or more parallax images in a composite manner so that approximately identical sections of the two or more parallax images, each having been divided into a plurality of sections in the horizontal direction, are arranged by a predetermined order; and a mask in which aperture parts and shading parts are alternatively provided in the horizontal direction and which allows light from pixel units for displaying respective sections of a same parallax image to be emitted from all of the pixel units to reach, through the aperture parts, observation regions which are different depending on the parallax image, wherein on each of the aperture parts of said mask, a filter unit composed of color filters of a plurality of colors which are arranged in the horizontal direction is provided, wherein the pixel units are each composed of red, green, and blue sub-pixels or yellow, cyan, and magenta sub-pixels, and wherein the filter units are each composed of color filters of five colors which consist of two colors from red, green, and blue, one color from white and transparent, and two colors from yellow, cyan and magenta.

11. A three-dimensional image display apparatus according to claim 10, wherein said mask allows light from sub-pixels of a plurality of colors, which compose the pixel units for displaying the same parallax image to be emitted from all of the pixel units to reach an approximately identical region.

12. A three-dimensional image display apparatus according to claim 10, wherein said display device is of a transmission type, wherein a light emitting surface emits light for illuminating said display device, and wherein a lenticular lens provided between the light emitting surface and said mask provides the light emitting surface and said mask with a conjugated positional relationship.

13. A three-dimensional image display apparatus according to claim 12, wherein light sources emit light from the light emitting surface and a microlens array is provided in front of the light emitting surface.

14. A three-dimensional image display apparatus according to claim 10, wherein observation regions different, depending on the parallax image at parts thereof, overlap with each other.

15. A three-dimensional image display apparatus comprising:

a display device which has pixel units, each composed of sub-pixels of a plurality of colors arranged in the horizontal direction and each being a unit of display, and which displays two or more parallax images in a composite manner so that approximately identical sections of the two or more parallax images, each having been divided into a plurality of sections in the horizontal direction, are arranged by a predetermined order; and a mask in which aperture parts and shading parts are alternatively provided in the horizontal direction and which allows light from pixel units for displaying respective sections of a same parallax image to be emitted from all of the pixel units to reach, through the aperture parts, observation regions which are different depending on the parallax image, wherein on each of the aperture parts of said mask, a filter unit composed of color filters of a plurality of colors which are arranged in the horizontal direction is provided, and wherein the following conditions are satisfied:

$$D_1h:E_1=L_1m_1d_1:L_1$$

$$D_1h/3:c_1h=L_1m_1d_1+L_1:L_1$$

$$E_1:3c_1h=L_1m_1d_1+L_1:L_1m_1d_1$$

$$N\times E_1:m_1h=L_1m_1d_1+L_1:L_1m_1d_1$$

$$e_1:3c_1h=L_1+L_1m_1f_1:L_1m_1f_1$$

$$L_1m_1d_1=L_1f_1d_1+L_1m_1f_1$$

$$D_1h/3:3c_1h=L_1f_1d_1:L_1m_1f_1$$

$$D_1h/3:e_1=L_1f_1d_1:L_1+L_1m_1f_1$$

where $D_1h$ is the horizontal pitch of the pixel units in said display device, the $D_1h/3$ is horizontal pitch of the sub-pixels in said display device, $c_1h$ is the horizontal pitch of the color filters in said mask, $5c_1h$ is the horizontal width of the filter unit in said mask, $3c_1h$ is the horizontal width of each region in the filter unit through which light from each of the sub-pixels of a plurality of colors can transmit, $m_1h$ is the repeating pitch in the horizontal direction of the shading parts and the filter units in said mask, $L_1m_1d_1$ is the distance between said display device and said mask, $L_1$ is the distance from said mask to an observation region, $E_1$ is the horizontal pitch of the observation regions which is different depending on the parallax image, N is the number of the parallax images, when $f_1$ is an intersection of straight lines between both end parts in the horizontal direction of one of the sub-pixels of the display device and both end parts of the color filters through which light from one of sub-pixel can transmit, $L_1f_1d_1$ is the distance between the intersection $f_1$ and said display device, $L_1m_1f_1$ is the distance between the intersection $f_1$ and said mask, and $e_1$ is the horizontal width of the parallax image at the observation region.

16. A three-dimensional image display apparatus comprising:

a display device which has pixel units, each composed of a plurality of sub-pixels which allow light of mutually different colors to transmit, arranged in a horizontal direction and each being a unit of display, and which displays two or more parallax images in a composite manner so that approximately identical sections of the two or more parallax images, each having been divided into a plurality of sections in the horizontal direction, are arranged by a predetermined order; and a light source array in which light-emitting parts and non-light-emitting parts are alternatively provided in the horizontal direction and which illuminates said display device so that light from the pixel units for displaying respective sections of a same parallax image is emitted from all of the pixel units and reaches observation regions which are different depending on the parallax image, wherein the light emitting parts of said light source array are each constructed by arranging a plurality of light sources which emit light of mutually different colors in the horizontal direction, wherein the pixel units are each composed of red, green, and blue sub-pixels or yellow, cyan, and magenta sub-pixels, and wherein the light-emitting parts are each composed of light sources which emit light of five colors which consist of two colors from red, green, and blue, one color from white and transparent, and two colors from yellow, cyan and magenta.

17. A three-dimensional image display apparatus according to claim 16, wherein said light source array illuminates said display device so as to allow light from a plurality of sub-pixels of the pixel units to display the same parallax image to be emitted from all of the pixel units to reach an approximately identical region.

18. A three-dimensional image display device according to claim 16, wherein a lenticular lens is provided between said light source array and said display device.

19. A three-dimensional image display apparatus according to claim 16, wherein observation regions, different depending on the parallax image at parts thereof, overlap with each other.

20. A three-dimensional image display apparatus comprising:

a display device which has pixel units, each composed of a plurality of sub-pixels which allow light of mutually different colors to transmit, arranged in a horizontal direction and each being a unit of display, and which displays two or more parallax images in a composite manner so that approximately identical sections of the two or more parallax images, each having been divided into a plurality of sections in the horizontal direction, are arranged by a predetermined order; and a light source array in which light-emitting parts and non-light-emitting parts are alternatively provided in the horizontal direction and which illuminates said display device so that light from the pixel units for displaying respective sections of a same parallax image is emitted from all of the pixel units and reaches observation regions which are different depending on the parallax image, wherein the light emitting parts of said light source array are each constructed by arranging a plurality of light sources which emit light of mutually different colors in the horizontal direction, and wherein the following conditions are satisfied:

$$E_2:D_2h=L_2+L_2d_2m_2:L_2d_2m_2$$

$$c_2h:D_2h/3=L_2+L_2d_2m_2:L_2$$

$$L_2d_2f_2+L_2f_2m_2=L_2d_2m_2$$

$$e_2:(km_2+2)\times c_2h=L_2+L_2d_2f_2:L_2f_2m_2$$

$$kd_2\times D_2h/3:(km_2+2)\times c_2h=L_2d_2f_2:L_2f_2m_2$$

$$m_2h:N\times D_2h=L_2+L_2d_2m_2:L_2$$

$$m_2h:N\times E_2=L_2d_2m_2:L_2$$

where $D_2h$ is the horizontal pitch of the pixel units in said display device, $D_2h/3$ is the horizontal pitch of the sub-pixels in said display device, $c_2h$ is the horizontal pitch of the light sources in said light source array, $(km_2+4)c_2h$ is the horizontal width in the light-emitting part of said light source array, $(km_2+2)c_2h$ is the horizontal width of each of sets of the light sources which emit a light to transmit through each of the sub-pixels, when the non-light-emitting part and the light emitting part are provided as a unit, $m_2h$ is the repeating pitch in the horizontal direction of the units, $L_2d_2m_2$ is the distance between said display device and said light source array, $L_2$ is the distance from said display device to an observation region, $E_2$ is the horizontal pitch of the observation regions, when $f_2$ is an intersection of straight lines between both end parts in the horizontal direction of the sub-pixel for one color of the lights of the display device and both end parts of the light sources which emit lights to transmit through these sub-pixels for the one color of the lights, $L_2d_2f_2$ is the distance between the intersection $f_2$ and said display device, $L_2f_2m_2$ is the distance between the intersection $f_2$ and said light source arrays, $kd_2$ is the pixel aperture ratio in the horizontal direction in said display device, $km_2$ is the light source aperture ratio in the horizontal direction in said light source array, N is the number of the parallax images, and $e_2$ is the horizontal width of the parallax image at the observation region.

* * * * *

UNITED STATES PATENT AND TRADEMARK OFFICE

CERTIFICATE OF CORRECTION

PATENT NO. : 6,980,176 B2 
APPLICATION NO. : 10/241699
DATED : December 27, 2005
INVENTOR(S) : Kazumi Matsumoto et al.

It is certified that error appears in the above-identified patent and that said Letters Patent is hereby corrected as shown below:

[73] ASSIGNEE:

“Hitdesign Ltd., Kanagawa (JP); Canon Kabushiki Kaisha, Tokyo (JP)” should read --Canon Kabushiki Kaisha, Tokyo (JP)--.

Figure 14A:
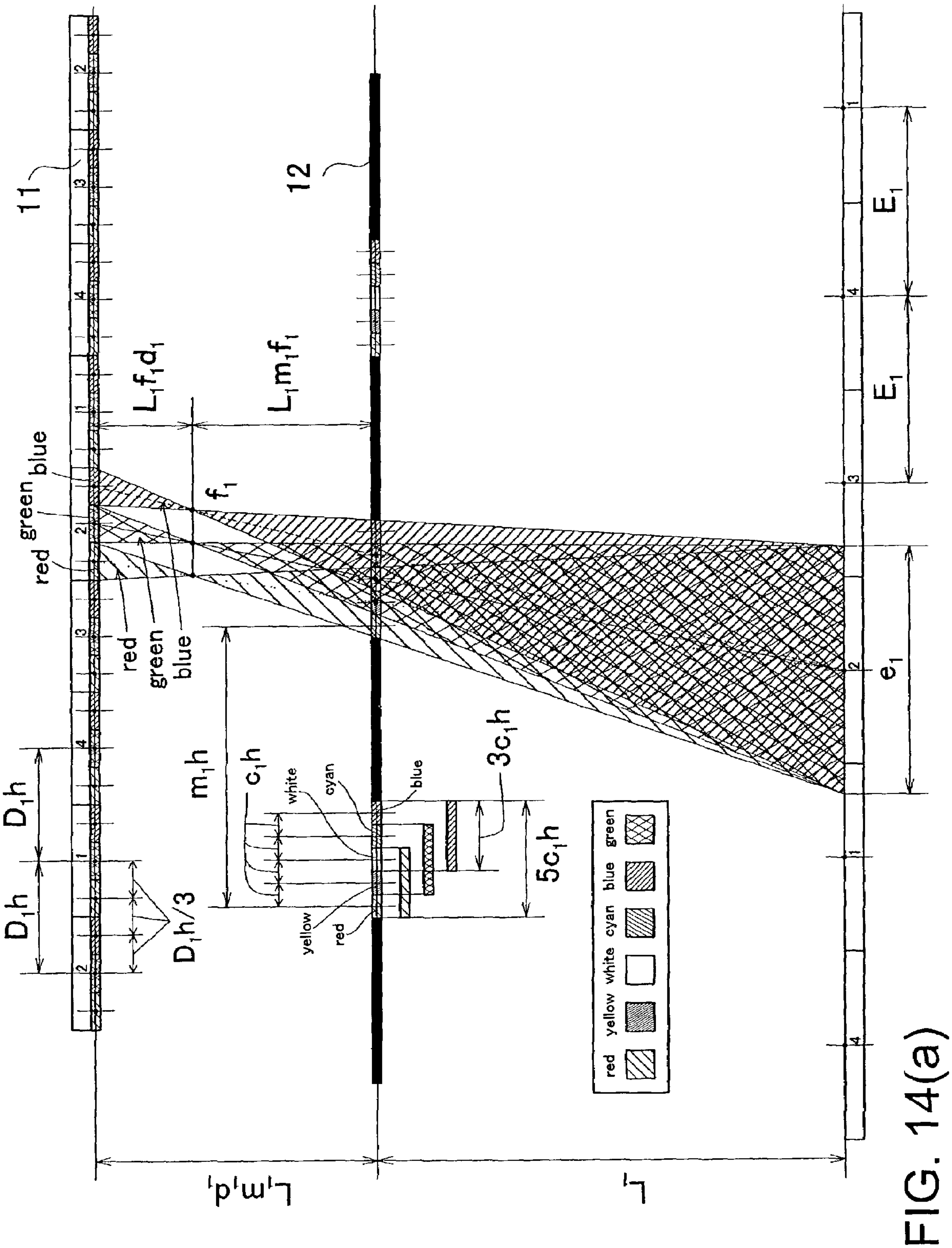
FIG. 14(*a*) and FIG. 14(*b*) are for explaining an improvement of color eclipses in detail of the present invention.
Figure 14B:
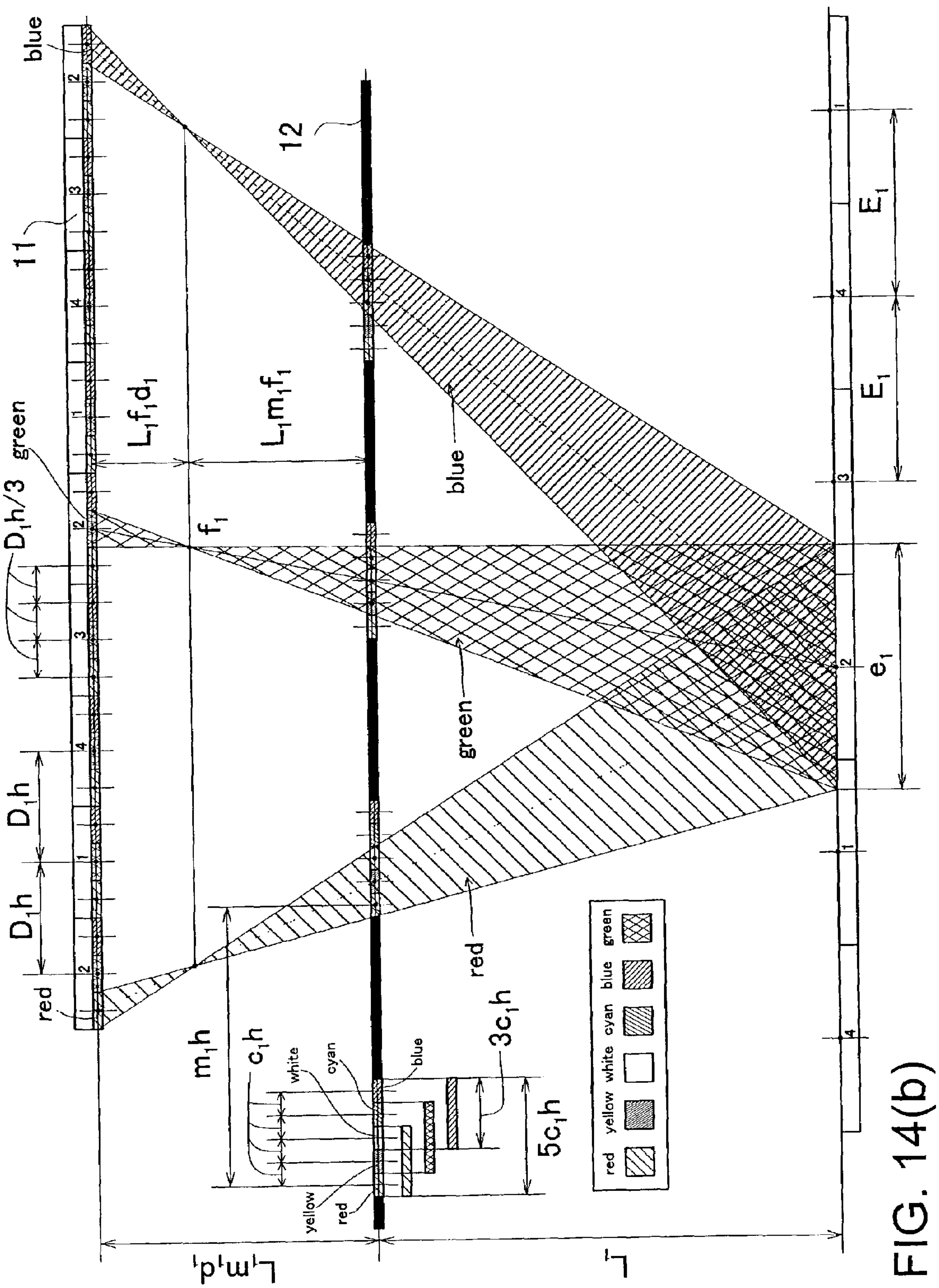

COLUMN 11:

Line 1, “FIG. 14” should read --FIGS. 14(a) and 14(b)--.
Line 52, “is” should read --are--.

COLUMN 12:

Line 23, “$L_1f_1d_1$.” should read --$L_1f_1'd_1$.--.
Line 34, “$L\ _1f_1 \cdot d_1{:}L_1m_1f_1'$” should read --$L_1f_1'd_1{:}L_1m_1f_1'$--.
Line 36, “$L\ \ _1 +L_1m_1f_1'$” should read --$L_1 +L_1m_1f_1'$--.

COLUMN 14:

Line 51, “$L\ _2f_2m_2$” should read --$L_2f_2m_2$--.
Line 53, “$L_2d\ _2f_2{:}L_2f_2m_2$” should read --$L_2d_2f_2{:}L_2f_2m_2$--.

COLUMN 17:

Line 6, “$L_3m\ _3vl1_1{:}L_3vl_1m_4$” should read --$L_3m_3vl_1{:}L_3vl_1m_4$--.
Line 8, “$L\ _3m_3vl_1$” should read --$L_3m_3vl_1$--.

COLUMN 18:

Line 65, “$2xpxm_2v{:}hl_1$” should read --$2xPxm_2v{:}hl_1$--.

UNITED STATES PATENT AND TRADEMARK OFFICE

CERTIFICATE OF CORRECTION

PATENT NO. : 6,980,176 B2
APPLICATION NO. : 10/241699
DATED : December 27, 2005
INVENTOR(S) : Kazumi Matsumoto et al.

It is certified that error appears in the above-identified patent and that said Letters Patent is hereby corrected as shown below:

COLUMN 23:

Line 49, "claim 4," should read --claim 7,--.

COLUMN 24:

Line 46, "observation regions different," should read --different observation regions,--.

Signed and Sealed this

Fifth Day of February, 2008

JON W. DUDAS
*Director of the United States Patent and Trademark Office*